US010088036B2

(12) United States Patent
Uenomachi et al.

(10) Patent No.: US 10,088,036 B2
(45) Date of Patent: Oct. 2, 2018

(54) MULTI-DIRECTIONAL OPERATING DEVICE AND VEHICLE SHIFT APPARATUS USING THE MULTI-DIRECTIONAL OPERATING DEVICE

(71) Applicant: ALPS ELECTRIC CO., LTD., Tokyo (JP)

(72) Inventors: Takashi Uenomachi, Miyagi-ken (JP); Keisuke Sato, Miyagi-ken (JP)

(73) Assignee: ALPS ELECTRIC CO., LTD., Tokyo (JP)

( * ) Notice: Subject to any disclaimer, the term of this patent is extended or adjusted under 35 U.S.C. 154(b) by 141 days.

(21) Appl. No.: 15/203,454

(22) Filed: Jul. 6, 2016

(65) Prior Publication Data

US 2017/0009876 A1    Jan. 12, 2017

(30) Foreign Application Priority Data

Jul. 6, 2015   (JP) ................. 2015-135389

(51) Int. Cl.
| F16H 59/00 | (2006.01) |
| F16H 59/10 | (2006.01) |
| F16H 61/24 | (2006.01) |
| G05G 9/047 | (2006.01) |
| H01H 5/02 | (2006.01) |
| F16H 59/02 | (2006.01) |

(52) U.S. Cl.
CPC ....... F16H 59/105 (2013.01); F16H 59/0204 (2013.01); F16H 59/10 (2013.01); F16H 61/24 (2013.01); G05G 9/047 (2013.01); H01H 5/02 (2013.01); B60Y 2410/132 (2013.01); F16H 2061/243 (2013.01)

(58) Field of Classification Search
CPC .... F16H 59/105; F16H 59/0204; F16H 61/24; F16H 59/10; F16H 2061/243; H01H 5/02; G05G 9/047; B60Y 2410/132
See application file for complete search history.

(56) References Cited

U.S. PATENT DOCUMENTS

| 6,923,083 B2 | 8/2005 | Fujinuma | |
| 2008/0148894 A1* | 6/2008 | Rapin ................ F16H 59/0204 | 74/473.21 |
| 2010/0321215 A1* | 12/2010 | Kato ................... H01H 25/008 | 341/35 |

FOREIGN PATENT DOCUMENTS

JP    2002-144905    5/2002

* cited by examiner

Primary Examiner — Victor L MacArthur
(74) Attorney, Agent, or Firm — Brinks Gilson & Lione

(57) ABSTRACT

A multi-directional operating device includes an operating member, a support body, movable members, a pair of movable magnetic members, a facing magnetic member, stopper portions, a drive member, and a cam member. One of the drive member and the cam member has a guide surface having a first projection, and another of the drive member and the cam member has a sliding surface having a second projection. When the operating member is inclined in a first direction, one of the movable magnetic members is inclined, and inclination of another movable magnetic member is stopped by one of the stopper portions. When the operating member is inclined in a second direction, the first projection and the second projection are moved beyond projecting portions of each other and slide on each other. This multi-directional operating device is preferably applied to a vehicle shift apparatus.

8 Claims, 19 Drawing Sheets

FIG. 9A
FIG. 9B
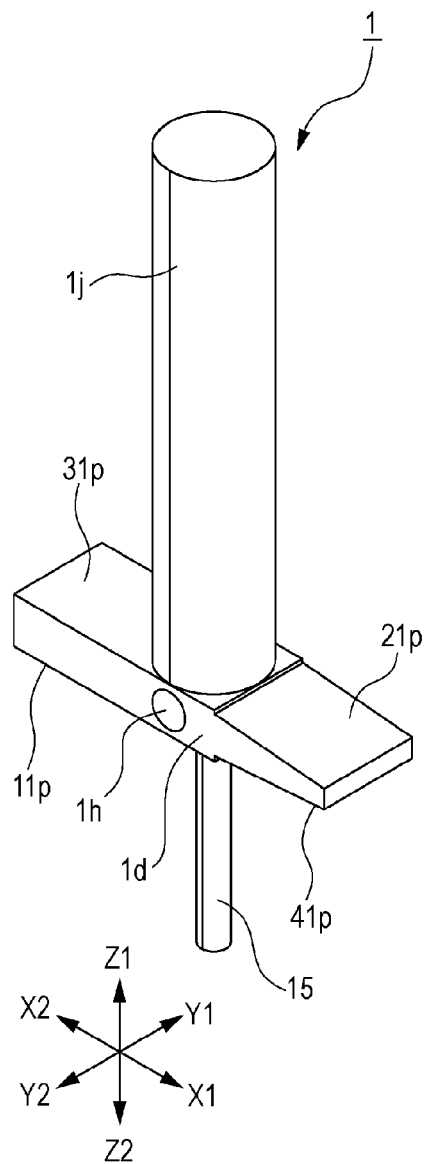
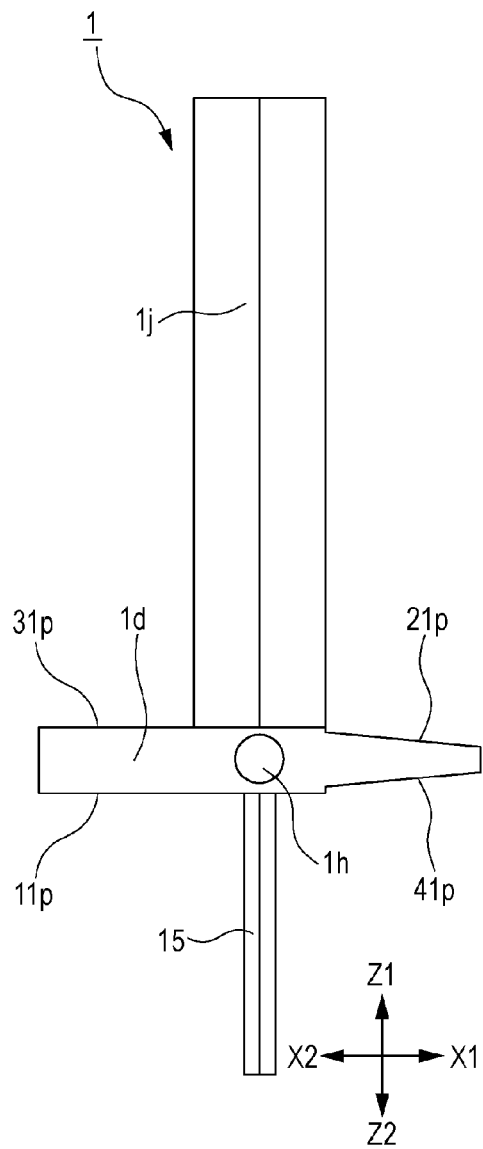

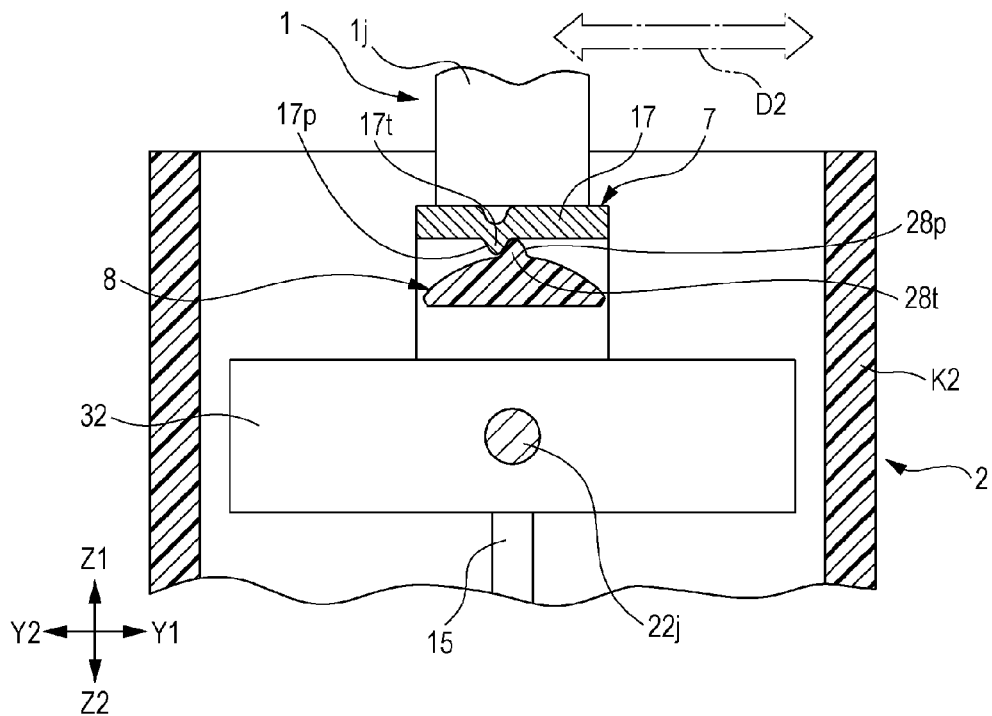
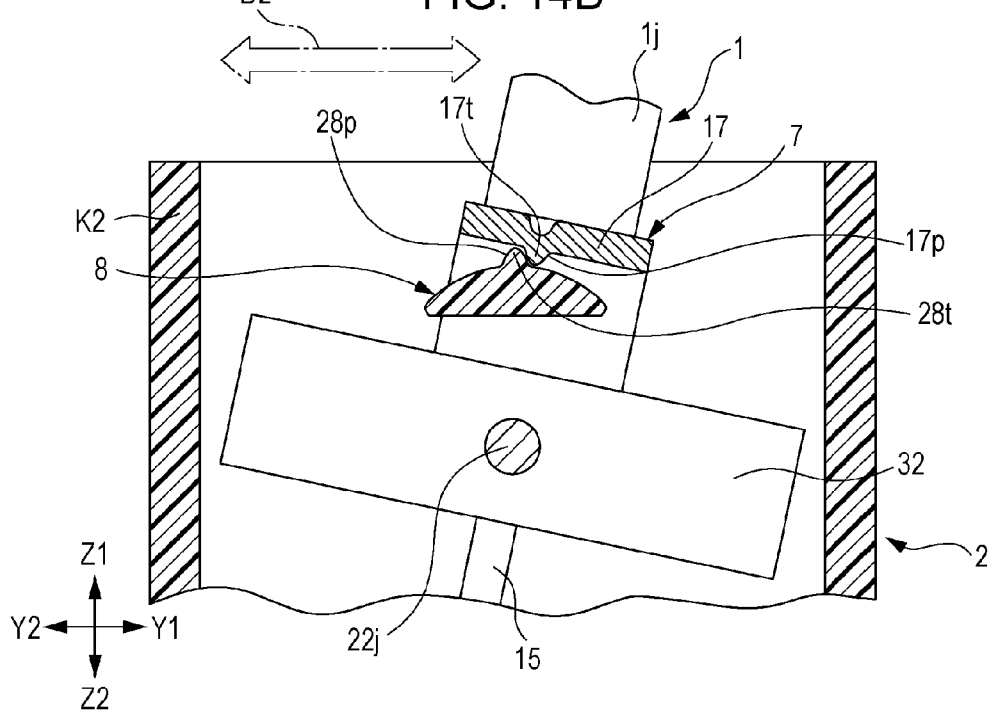

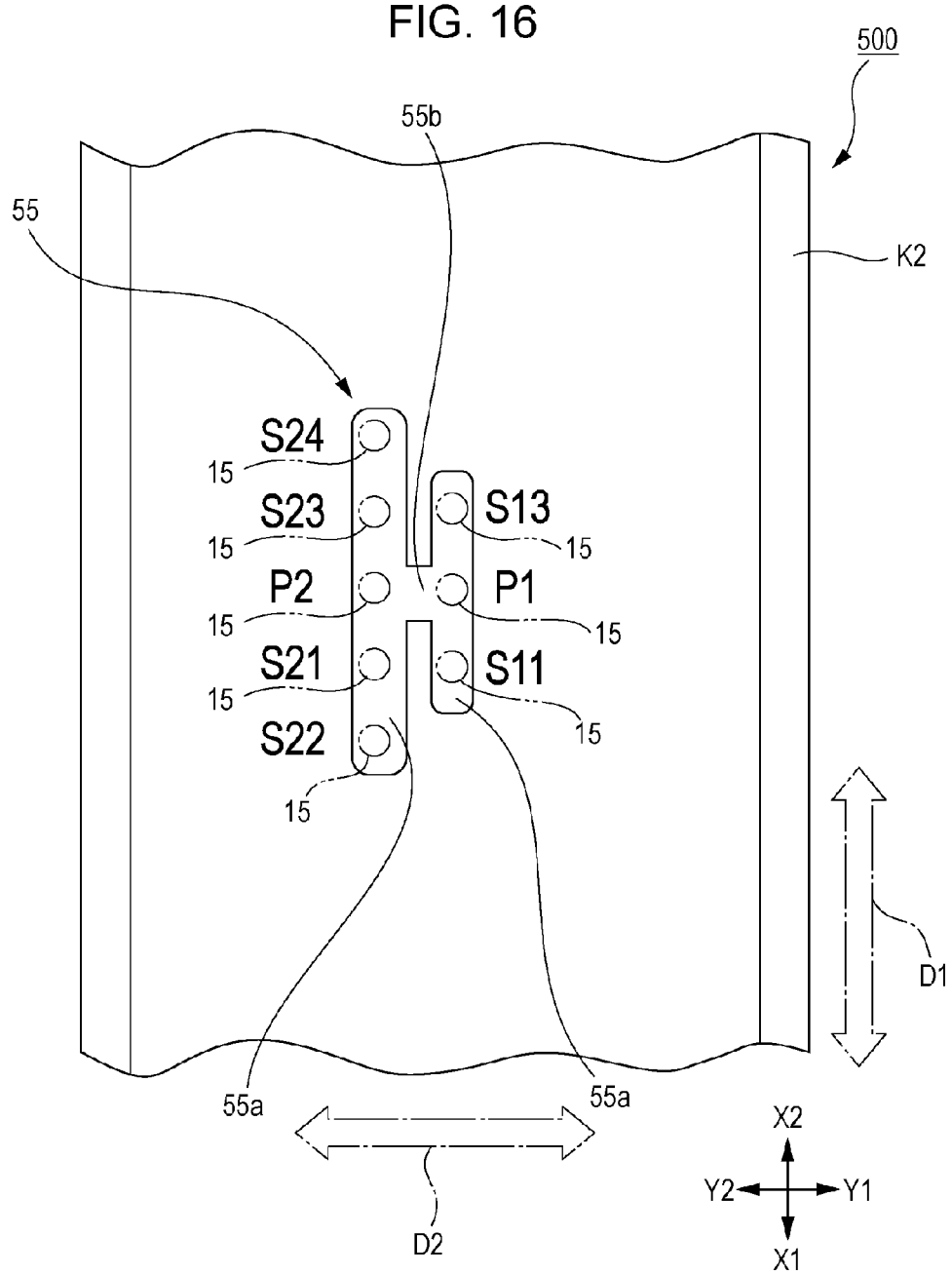

MULTI-DIRECTIONAL OPERATING DEVICE AND VEHICLE SHIFT APPARATUS USING THE MULTI-DIRECTIONAL OPERATING DEVICE

CLAIM OF PRIORITY

This application claims benefit of priority to Japanese Patent Application No. 2015-135389 filed on Jul. 6, 2015, which is hereby incorporated by reference in its entirety.

BACKGROUND

1. Field of the Disclosure

The present disclosure relates to a multi-directional operating device used for operating body that is operated by being inclined. The present disclosure particularly relates to a multi-directional operating device using a magnetic body and a vehicle shift apparatus using this multi-directional operating device.

2. Description of the Related Art

In general, operating bodies that are operated by being inclined are widely used for devices such as remote controllers for an electronic device such as a television or a video cassette recorder, input devices for a game machine, and multi-directional operating devices for a vehicle. Particularly for, for example, the input devices for a game machine and the multi-directional operating devices for a vehicle, a type of the multi-directional operating devices is used with which the operating body is held to perform inclination operation. Accordingly, there exists a demand for, for example, the multi-directional operating devices for a vehicle that provide, in order to improve operating sensation, tactile sensation when a changing operation is performed by inclining the operating body.

As such a multi-directional operating device providing the tactile sensation, Japanese Unexamined Patent Application Publication No. 2002-144905 (related-art example) has proposed a shift operating apparatus for an automatic transmission 900 (FIGS. 18 and 19) applied to a vehicle having a shift pattern of FIG. 17. FIG. 17 is a top view of the shift pattern of the vehicle to which the shift operating apparatus for an automatic transmission 900 is applied. FIG. 18 is an enlarged longitudinal sectional view of a state in which a shift lever 901 is in an N range (neutral range) of FIG. 17 in the shift operating apparatus for the automatic transmission 900 of the related-art example. FIG. 19 is an enlarged longitudinal sectional view of a state in which the shift lever 901 is at a second line II of FIG. 17 in the shift operating apparatus for an automatic transmission 900 of the related-art example.

The shift operating apparatus for an automatic transmission 900 of FIGS. 18 and 19 includes the following components: the shift lever 901 to which a knob 902 is secured and which is swung; a holder 903 which is secured to the shift lever 901 and which is swung; a first shaft 905 which allows the shift lever 901 to be swung and a second shaft 907 (see FIG. 19) perpendicular to the first shaft 905; and a casing 904 by which the first shaft 905 and the second shaft 907 are rotatably supported.

As illustrated in FIG. 18, the shift lever 901 of the shift operating apparatus for an automatic transmission 900 can be swung in a Y direction of FIG. 17 about the first shaft 905 as a swing axis to positions of FIG. 17 including a P range (parking range), an R range (reverse range), the N range (neutral range), and a D range (drive range). In so doing, the shift lever 901 is supported at each of the positions (P range, R range, N range, or D range) and automatically returned by using a tactile spring 909 and a tactile member 910 disposed in a lower body 903c of the holder 903 and tactile grooves 904A formed at an inner bottom of the casing 904. Specifically, as illustrated in FIG. 18, the tactile grooves 904A include the following tactile grooves arranged in the front-rear direction: a first tactile groove 904b that supports the shift lever 901 in the P range; a second tactile groove 904c that supports the shift lever 901 in the R range; a third tactile groove 904d that supports the shift lever 901 in the N range; and the fourth tactile groove 904e that supports the shift lever 901 in the D range. The tactile member 910 urged by the tactile spring 909 slides on these tactile grooves 904A.

Furthermore, when being swung to the positions, the shift lever 901 is moved to a first line I, the second line II, a third line III, and a fourth line IV of FIG. 17 and is swung. Thus, as illustrated in FIG. 19, the shift lever 901 of the shift operating apparatus for an automatic transmission 900 can also be swung in the X direction of FIG. 17 about the second shaft 907 as the swing axis. In so doing, the shift lever 901 can be similarly moved to lines (first line I, second line II, third line III, and fourth line IV) by using the tactile spring 909 and the tactile member 910 disposed in the lower body 903c of the holder 903 and tactile grooves 904B formed at the inner bottom of the casing 904.

With the shift operating apparatus for an automatic transmission 900 structured as described above, the tactile sensation can be provided to the shift lever 901 when the tactile member 910 moved between the tactile grooves 904A and tactile grooves 904B provided corresponding to the positions and the lines.

However, in order to provide the tactile sensation, a sliding mechanism in which the tactile member 910 slides on the tactile grooves 904A and the tactile grooves 904B is used for the related-art example. Accordingly, when swing operation of the shift lever 901 is repeatedly performed, there arises a problem of degradation of the durability of the sliding mechanism such as wear on the tactile grooves 904A, the tactile grooves 904B, and the tactile spring 909, degradation of spring properties of the tactile spring 909, and play between the tactile spring 909 and the tactile member 910. Furthermore, since the tactile member 910 is urged by the tactile spring 909, a space is required in the depth direction (Z2 direction of FIG. 18). Thus, it is difficult to reduce the thickness of the apparatus.

SUMMARY

According to the first aspect of the present invention, a multi-directional operating device includes an operating member, a support body, a plurality of stopper portions, a plurality of movable members, at least one pair of movable magnetic members, a facing magnetic member, a drive member, and a cam member. The operating member is able to be inclined by being subjected to an operation performed by an operator. The support body supports the operating member so as to allow the operating member to be inclined. The plurality of stopper portions respectively correspond to a plurality of positions which are provided in the multi-directional operating device and at which the operating member subjected to an inclination operation from a reference position performed by the operator is positioned. The plurality of movable members are inclined together with the operating member. The at least one pair of movable magnetic members face each other, are each provided in a corresponding one of the plurality of movable members, and are formed of a soft magnetic material. The facing magnetic member is disposed between the at least one pair of movable magnetic members and formed of a permanent magnet. The drive member is provided in either or each of one of the plurality of movable members and one of the at least one pair of the movable magnetic members and rotated as the operating member is inclined. The cam member is provided in the support body so as to face one side of the drive member. One of the drive member and the cam member that face each other has a guide surface having a first projection having a projection shape, another of the drive member and the cam member has a sliding surface having a second projection having a projection shape, and the guide surface and the sliding surface slide on each other. When the operating member is at the reference position, the at least one pair of movable magnetic members are disposed close to each other and attracted to each other and the guide surface and the sliding surface are in contact with each other due to attracting forces of the at least one pair of movable magnetic members. When the operating member is inclined in a first direction from the reference position so as to be positioned at any one of positions in the first direction out of the plurality of positions, one of the at least one pair of movable magnetic members is inclined and inclination of another of the at least one pair of movable magnetic members is stopped by a corresponding one of the plurality of stopper portions. When the operating member is inclined from the reference position in a second direction intersecting the first direction so as to be positioned at any one of positions in the second direction out of the plurality of positions, the first projection of the guide surface and the second projection of the sliding surface are moved beyond projecting portions of each other and slide on each other.

BRIEF DESCRIPTION OF THE DRAWINGS

FIG. 2A is a front view seen from the Y2 side of FIG. 1, and FIG. 2B is a side view seen from the X1 side of FIG. 1;

FIG. 4A is a plan view illustrating a shift arrangement of the vehicle, and FIG. 4B is a plan view illustrating positions of the shift knob;

FIG. 8A is a front view seen from the Y2 side of FIG. 7, and FIG. 8B is a side view seen from the X1 side of FIG. 7;

FIGS. 9A and 9B illustrate the multi-directional operating device according to the first embodiment of the present invention, and out of FIGS. 9A and 9B, FIG. 9A is a perspective view of an operating member, and FIG. 9B is a front view of the operating member of FIG. 9A is seen from the Y2 side;

FIG. 10A is a top perspective view of a frame of the support body, and FIG. 10B is a bottom perspective view of the frame of the support body;

FIG. 11A illustrates a state at the reference position, FIG. 11B illustrates a state of inclination toward one side, and FIG. 11C illustrates a state where the inclination is performed further toward the one side than in the state of FIG. 11B;

FIG. 12A illustrates a state at the reference position, FIG. 12B illustrates a state of the inclination toward another side, and FIG. 12C illustrates a state where the inclination is performed further toward the other side than in the state of FIG. 12B;

FIG. 13A is a top perspective view of the casing seen from the X1-Y2 side of FIG. 5, and FIG. 13B is a top perspective view of the casing seen from the X2-Y2 side of FIG. 5;

FIGS. 14A and 14B illustrate a drive member and the cam member of the multi-directional operating device according to the first embodiment of the present invention, and out of FIGS. 14A and 14B, FIG. 14A is a partial sectional view taken along line XIV-XIV of FIG. 5, and FIG. 14B is a partial sectional view illustrating a state in which an inclination operation is performed on the operating member from a state of FIG. 14A;

FIG. 15A illustrates a state in which the operating member is positioned at a first position, FIG. 15B illustrates a state in which the operating member is positioned between the first position and a second position, and FIG. 15C illustrates a state in which the operating member is positioned at the second position;

FIG. 16 illustrates a guide portion of the multi-directional operating device according to the first embodiment of the present invention and is an enlarged plan view of portion XVI of FIG. 13A seen from the Z1 side;

DESCRIPTION OF THE EXEMPLARY EMBODIMENTS

An embodiment according to the present invention will be described below with reference to the drawings.

First Embodiment

Figure 1:
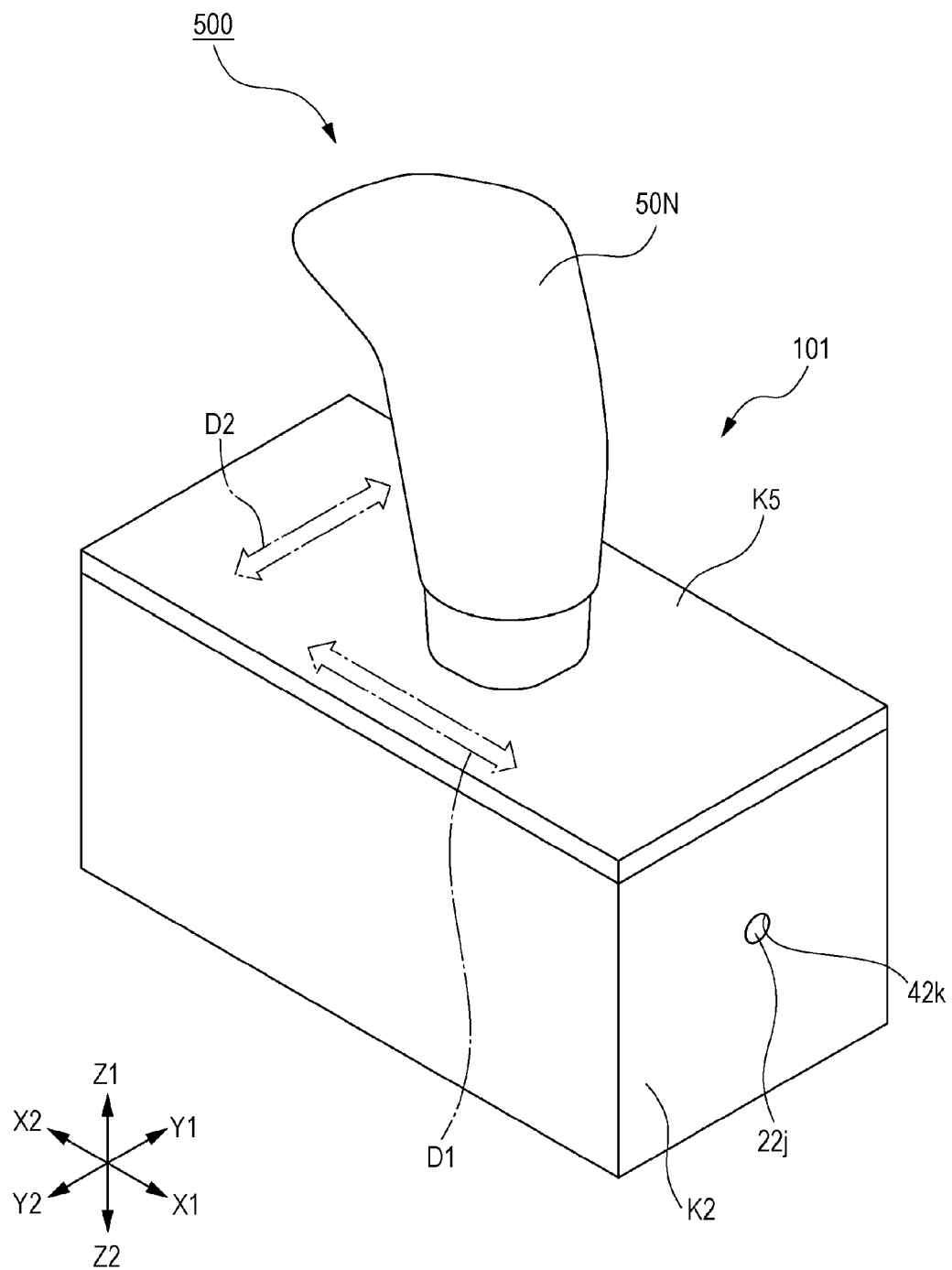
FIG. 1 is a perspective view illustrating a vehicle shift apparatus using a multi-directional operating device according to a first embodiment of the present invention.
Figure 2A:
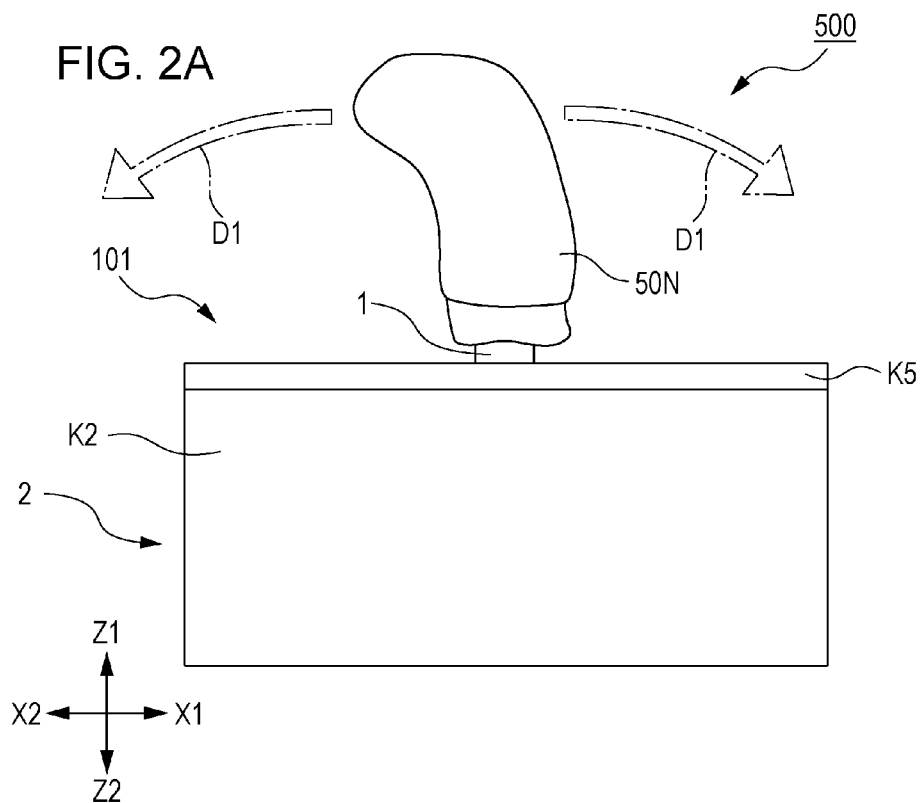
FIGS. 2A and 2B illustrate the vehicle shift apparatus using the multi-directional operating device according to the first embodiment of the present invention, and out of FIGS. 2A and 2B.
Figure 2B:
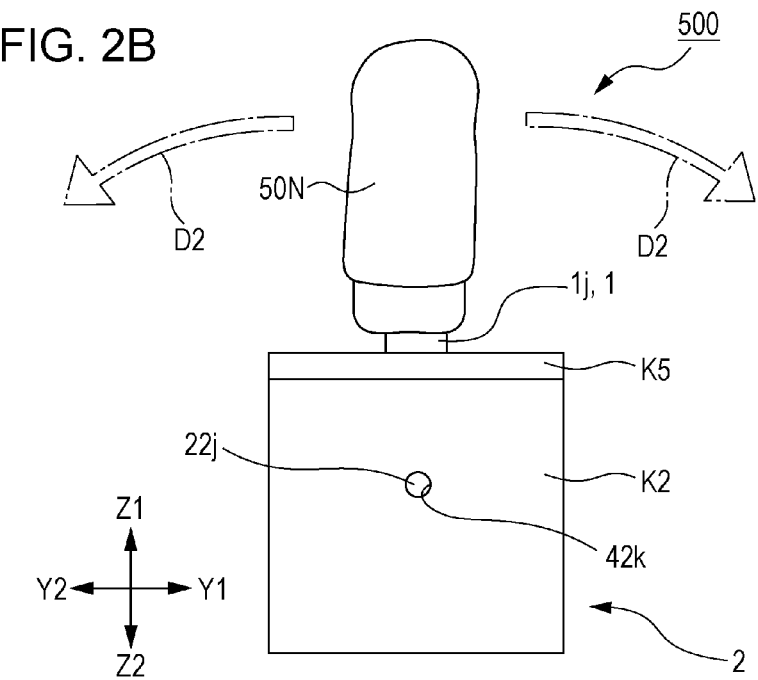
Figure 3:
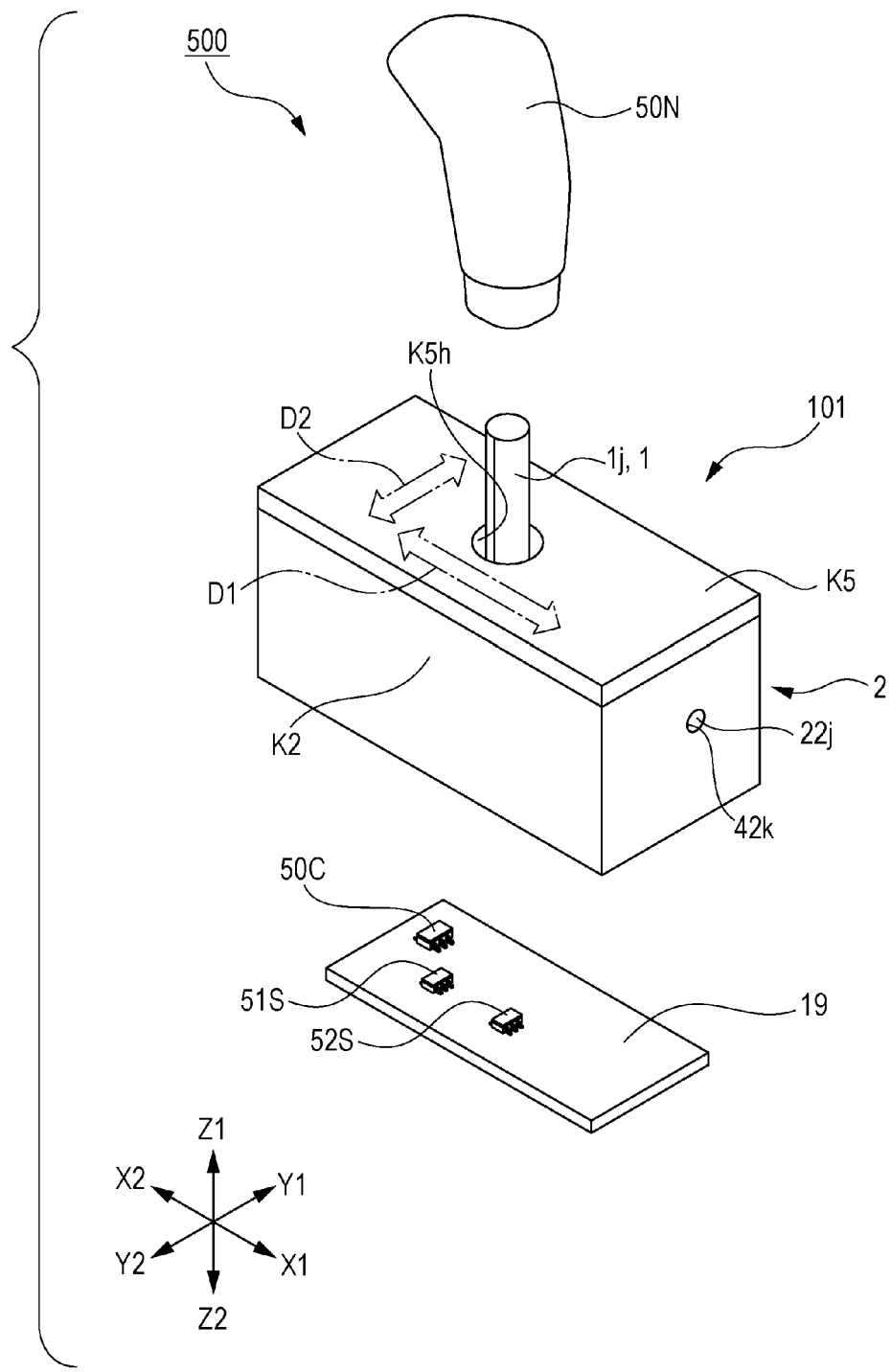
FIG. 3 is an exploded perspective view illustrating the vehicle shift apparatus using the multi-directional operating device according to the first embodiment of the present invention.

A multi-directional operating device 101 and a vehicle shift apparatus 500 according to a first embodiment of the present invention are described. Initially, the vehicle shift apparatus 500 using the multi-directional operating device 101 is described. FIG. 1 is a perspective view illustrating the vehicle shift apparatus 500 using the multi-directional operating device 101 according to the first embodiment of the present invention. FIGS. 2A and 2B illustrate the vehicle shift apparatus 500 using the multi-directional operating device 101 according to the first embodiment of the present invention, and out of FIGS. 2A and 2B, FIG. 2A is a front view seen from a Y2 side of FIG. 1, and FIG. 2B is a side view seen from an X1 side of FIG. 1. FIG. 3 is an exploded perspective view illustrating the vehicle shift apparatus 500 using the multi-directional operating device 101 according to the first embodiment of the present invention.

The vehicle shift apparatus 500 using the multi-directional operating device 101 according to the first embodiment of the present invention has a box-shaped appearance as illustrated in FIGS. 1 to 2B, and, as illustrated in FIG. 3, includes the following components: a shift knob 50N to be held by an operator; the multi-directional operating device 101 operable in multiple directions due to inclination operations of the shift knob 50N performed by the operator; a controller 50C that receives signals from the multi-directional operating device 101 and transmits signals to a vehicle-side device; and a position detector (not illustrated) that detects a plurality of positions where an operating member 1 of the multi-directional operating device 101 is positioned. According to the first embodiment of the present invention, as illustrated in FIG. 3, the vehicle shift apparatus 500 further includes the following components: a casing K2 (forming the appearance of the vehicle shift apparatus 500) used as part of a support body 2 of the multi-directional operating device 101 which will be described later; a cover K5 that covers an opening portion on the upper side of the casing K2; and a wiring board 19 on which the controller 50C is mounted and which is housed in the casing K2 of the multi-directional operating device 101. The vehicle shift apparatus 500 is disposed in a vehicle and used for shift operations of the vehicle in which the inclination operations can be performed in a first direction D1 being a front-rear direction (X direction of FIG. 1) and a second direction D2 being a left-right direction and perpendicular to the first direction D1 (Y direction of FIG. 1).

Initially, as illustrated in FIGS. 1 to 3, the shift knob 50N of the vehicle shift apparatus 500 has an elongated shape so as to allow the operator to easily hold the shift knob 50N. As illustrated in FIGS. 1 to 2B, the shift knob 50N is engaged with the operating member 1 so as to cover an operating shaft 1j of the operating member 1 of the multi-directional operating device 101 of FIG. 3.

The controller 50C of the vehicle shift apparatus 500 includes an integrated circuit (IC) and is mounted on the wiring board 19 (see FIG. 3) housed in the box-shaped casing K2 (which will be described later). The controller 50C is connected to the vehicle-side device through a connector (not illustrated), receives a positional information signal affected by each of the inclination operations of the shift knob 50N, and transmits the positional information signal to the vehicle-side device. Upon reception of the positional information signal, action corresponding to a shift pattern is performed and the position of the shift knob 50N in the shift pattern is displayed on a display provided in an instrument panel or the like on the vehicle side.

Although it is not illustrated, the position detector of the vehicle shift apparatus 500 uses a rotary variable resistor that includes a board on which a resistor pattern is formed and a wiper that is in sliding contact with the resistor pattern. The position detector includes a first detector that detects a plurality of positions in the inclination operations in the first direction D1 and a second detector that detects a plurality of positions in the inclination operations in the second direction D2. The first detector and the second detector are housed in the box-shaped casing K2. Although it will be described in detail later, the support body 2 preferably includes an inclination shaft (first inclination shaft) 12e and a second inclination shaft 22j (see FIG. 6 to be referred to later). In this case, the first detector is engaged with the inclination shaft 12e so as to detect a rotational angle of the inclination shaft 12e and the second detector is engaged with the second inclination shaft 22j so as to detect a rotational angle of the second inclination shaft 22j.

The position detector also includes a first signal processing unit 51S and a second signal processing unit 52S that respectively process a signal from a first position detector and a signal from a second position detector. The first signal processing unit 51S and the second signal processing unit 52S are mounted on the wiring board 19 as illustrated in FIG. 3. Furthermore, the first signal processing unit 51S and the second signal processing unit 52S are respectively connected to the first position detector and the second position detector through flexible printed circuits (FPCs, not illustrated). The first signal processing unit 51S calculates the rotational angle of the inclination shaft 12e in accordance with the signal from the first position detector and detects a movement of the operating member 1 in the first direction D1 in accordance with this rotational angle of the inclination shaft 12e. Likewise, the second signal processing unit 52S calculates the rotational angle of the second inclination shaft 22j in accordance with the signal from the second position detector and detects a movement of the operating member 1 in the second direction D2 in accordance with this rotational angle of the second inclination shaft 22j.

At last, the casing K2, the cover K5, and the wiring board 19 of the vehicle shift apparatus 500 are described. Initially, the casing K2 of the vehicle shift apparatus 500 is produced by forming a synthetic resin material such as polybutylene terephthalate (PBT), has a rectangular box shape, and has an opening portion defined by the opening in an upper surface.

Furthermore, as illustrated in FIG. 3, the casing K2 has a wall portion at an end thereof in the longitudinal direction (X direction of FIG. 3), and bearings 42k defined by circular through holes are formed in the wall portion. The second inclination shaft 22j (see FIG. 6 referred to later) of the support body 2, which will be described later, is inserted through the bearings 42k. The bearings 42k and the second inclination shaft 22j are included in the support body 2.

Next, the cover K5 of the vehicle shift apparatus 500 is, as is the case with the casing K2, produced by forming a synthetic resin material such as PBT. As illustrated in FIG. 3, the cover K5 has a plate shape and is disposed so as to cover the opening portion on the upper side of the casing K2 (see FIGS. 1 to 2B). Although it is not illustrated, the cover K5 is engaged with the casing K2.

Furthermore, as illustrated in FIG. 3, the cover K5 has a circular through hole K5h at its central portion. The operating shaft 1j of the operating member 1 is inserted through this through hole K5h so as to be exposed on the upper surface side of the cover K5.

At last, the wiring board 19 of the vehicle shift apparatus 500 uses a typical single-sided printed wiring board. As has been described, the controller 50C, the first signal processing unit 51S, and the second signal processing unit 52S are mounted on the wiring board 19 (see FIG. 3). Furthermore, although it is not illustrated, the FPCs are connected to the wiring board 19 so as to establish electrical connection between the first position detector and the first signal processing unit 51S and electrical connection between the second position detector and the second signal processing unit 52S. A connector for connection to an external device is also mounted on the wiring board 19.

Figure 4A:
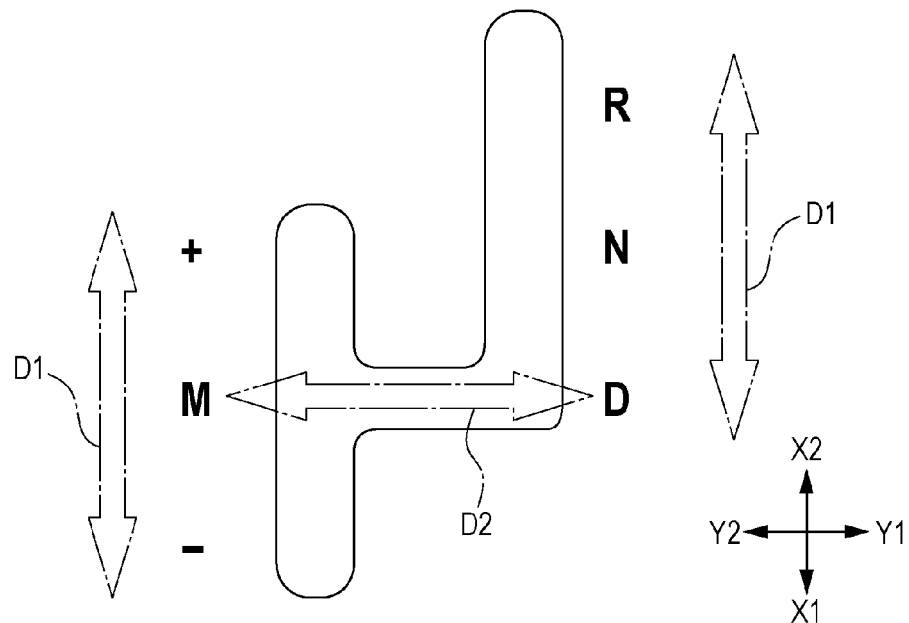
FIGS. 4A and 4B specifically illustrate operations of the vehicle shift apparatus using the multi-directional operating device according to the first embodiment of the present invention, and out of FIGS. 4A and 4B.
Figure 4B:
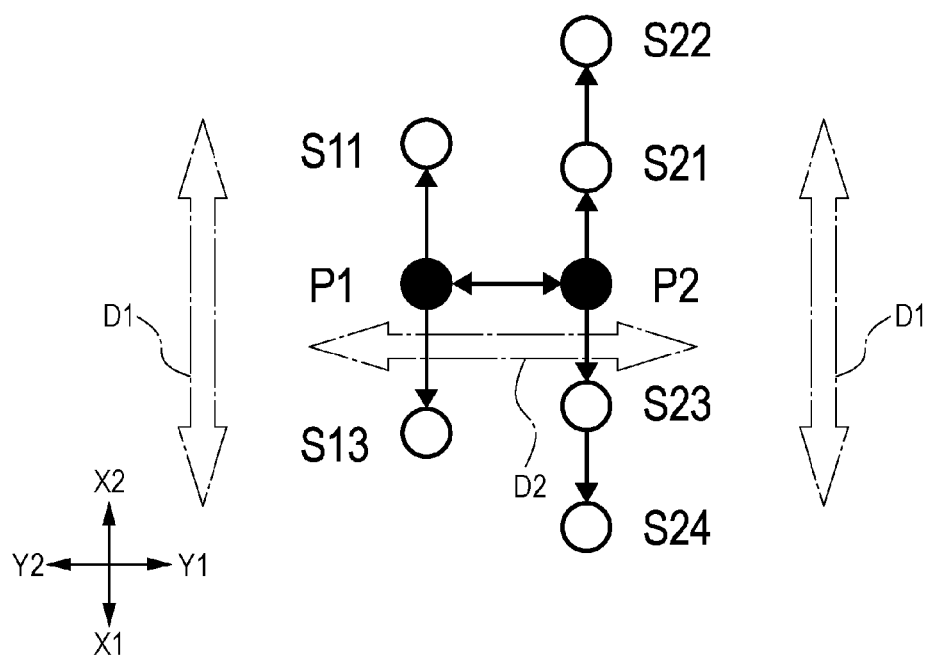

Here, shift operations of the vehicle shift apparatus 500 using the multi-directional operating device 101 according to the first embodiment of the present invention are described in detail with reference to FIGS. 4A and 4B. FIGS. 4A and 4B specifically illustrate operations of the vehicle shift apparatus 500 using the multi-directional operating device 101 according to the first embodiment of the present invention, and out of FIGS. 4A and 4B, FIG. 4A is a plan view illustrating a shift arrangement (shift pattern) of the vehicle, and FIG. 4B is a plan view illustrating positions of the shift knob 50N. The shift pattern of FIG. 4A is displayed in the display provided in the above-described instrument panel or the like. FIG. 4B schematically illustrates the positions where the operating member 1 is moved due to operations of the shift knob 50N (operating member 1).

The vehicle shift apparatus 500 according to the first embodiment of the present invention is not applied to a mechanically controlled vehicle in which the shift knob 50N is directly connected to a transmission. The vehicle shift apparatus 500 according to the first embodiment of the present invention is applied to an electrically controlled vehicle. Thus, each of the shift operations of the vehicle is performed only in accordance with an information signal about a shift position transmitted from the multi-directional operating device 101. This shift position is indicated in the shift pattern displayed in the display provided in the above-described instrument panel or the like.

For example, in the case where the shift knob 50N (operating member 1) is positioned at a second position P2 of FIG. 4B and the shift position is at a neutral mode "N" of FIG. 4A, by performing an inclination operation on the shift knob 50N in the X2 direction to a first front position S21 of FIG. 4B, the information signal indicating that the shift position is moved to the reverse mode "R" of FIG. 4A is transmitted to the vehicle side, and the shift operation of the vehicle is performed. The operator releases his or her hand from the shift knob 50N because of the completion of the operation, and accordingly, the shift knob 50N is automatically returned to the second position P2.

Furthermore, in the operation after that, by performing an inclination operation on the shift knob 50N at the second position P2 sequentially in the X1 direction to a first rear position S23 and a second rear position S24 of FIG. 4B, the shift position at the reverse mode "R" is sequentially moved to the neutral mode "N" and a drive mode "D" of FIG. 4A. Responding to this operation, the information signal indicating that the shift position is moved to the drive mode "D" of FIG. 4A is transmitted to the vehicle side, and the shift operation of the vehicle is performed. The operator releases his or her hand from the shift knob 50N because of the completion of the operation, and accordingly, the shift knob 50N is automatically returned to the second position P2.

Thus, for automatic operations having the reverse mode "R", the neutral mode "N", and the drive mode "D", the vehicle shift apparatus 500 assigns an automatic operation position serving as a reference position to the second position P2 of the operating member 1 of the multi-directional operating device 101. In so doing, as has been described, in order to change the reverse mode "R" to the drive mode "D", the inclination operation of the operating member 1 of the multi-directional operating device 101 can be performed in two steps in the X1 direction, that is, initially to the first rear position S23 and next to the second rear position S24. Likewise, in order to change the drive mode "D" to the reverse mode "R", the inclination operation of the operating member 1 of the multi-directional operating device 101 can be performed in two steps in the X2 direction, that is, initially to the first front position S21 and next to the second front position S22 of FIG. 4B. The movement direction of the operating member 1 of the multi-directional operating device 101 in the X direction, that is, the so-called inclination direction, is assigned to the first direction D1 of the shift operation of the vehicle.

Meanwhile, for example, in the case where the shift position is at the drive mode "D", by performing an inclination operation on the shift knob 50N at the second position P2 in the Y2 direction to the first position P1 of the operating member 1 of FIG. 4B, the shift position at the drive mode "D" is moved to a manual mode "M" of FIG. 4A. In so doing, even when the operator releases his or her hand from the shift knob 50N, the operating member 1 (shift knob 50N) remains at the first position P1 and is maintained in the inclined state without being changed.

Furthermore, in the operation after that, by performing an inclination operation on the shift knob 50N at the first position P1 in the X2 direction to a front position S11 of FIG. 4B, the information signal indicating that the shift position is moved to an upshift mode "+" of FIG. 4A is transmitted to the vehicle side, and the upshift operation of the vehicle is performed. Likewise, by performing an inclination operation on the shift knob 50N at the first position P1 in the X1 direction to a rear position S13 of FIG. 4B, the information signal indicating that the shift position is moved to a downshift mode "−" of FIG. 4A is transmitted to the vehicle side, and the downshift operation of the vehicle is performed.

Thus, for manual operations having the upshift mode "+" and the downshift mode "−", the vehicle shift apparatus 500 assigns a manual operation position serving as a reference position to the first position P1 of the operating member 1 of the multi-directional operating device 101. The movement direction of the operating member 1 of the multi-directional operating device 101 in the Y direction in which the operating member 1 is moved between the first position P1 and the second position P2, that is, the so-called inclination direction is assigned to the second direction D2 of the shift operation of the vehicle. Furthermore, for ease of understanding of the description, the first direction D1 and the second direction D2 of the inclination operations are also indicated in FIGS. 1 to 3.

Figure 5:
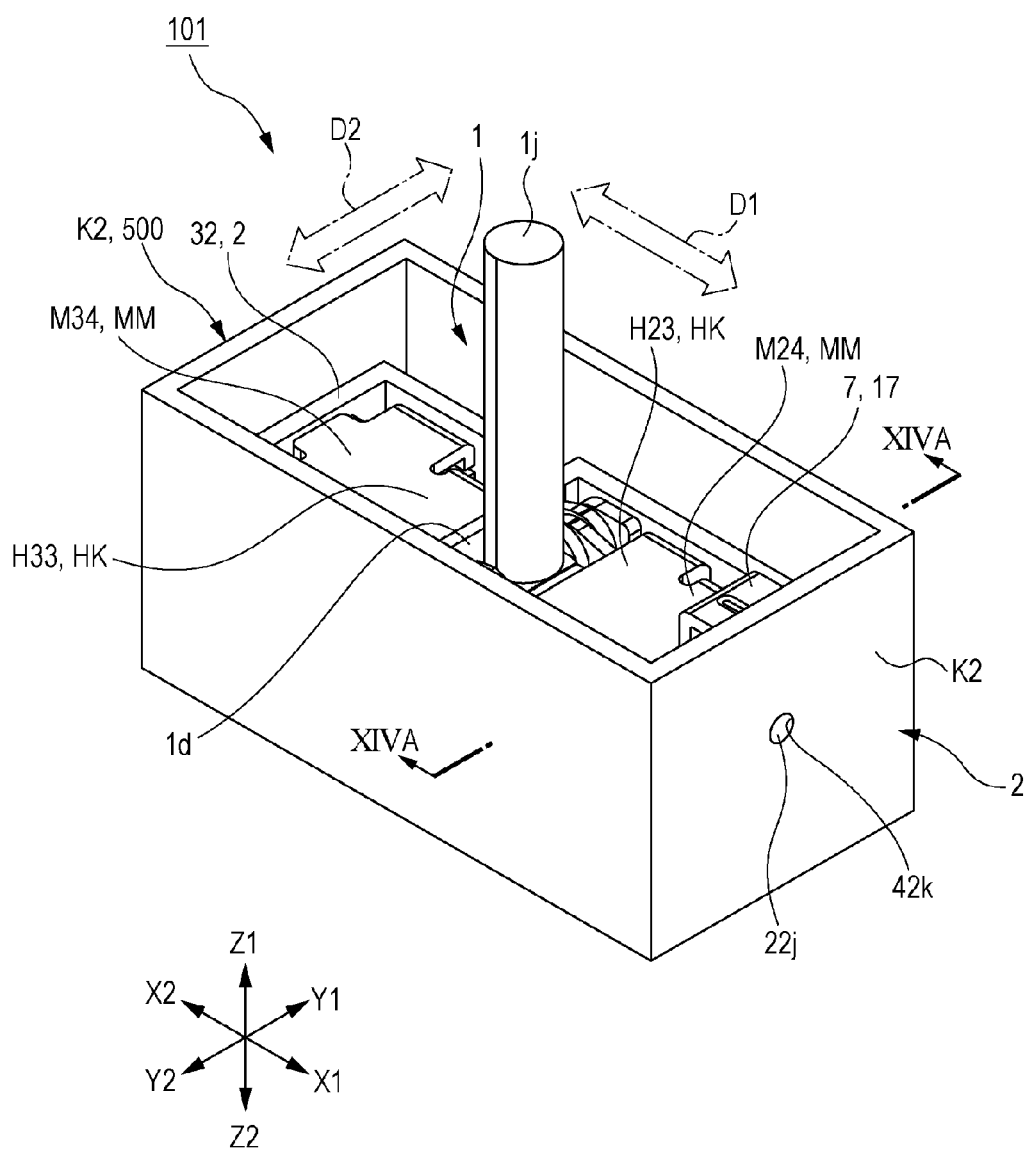
FIG. 5 illustrates the multi-directional operating device according to the first embodiment of the present invention and is a perspective view of a main portion of the multi-directional operating device.
Figure 6:
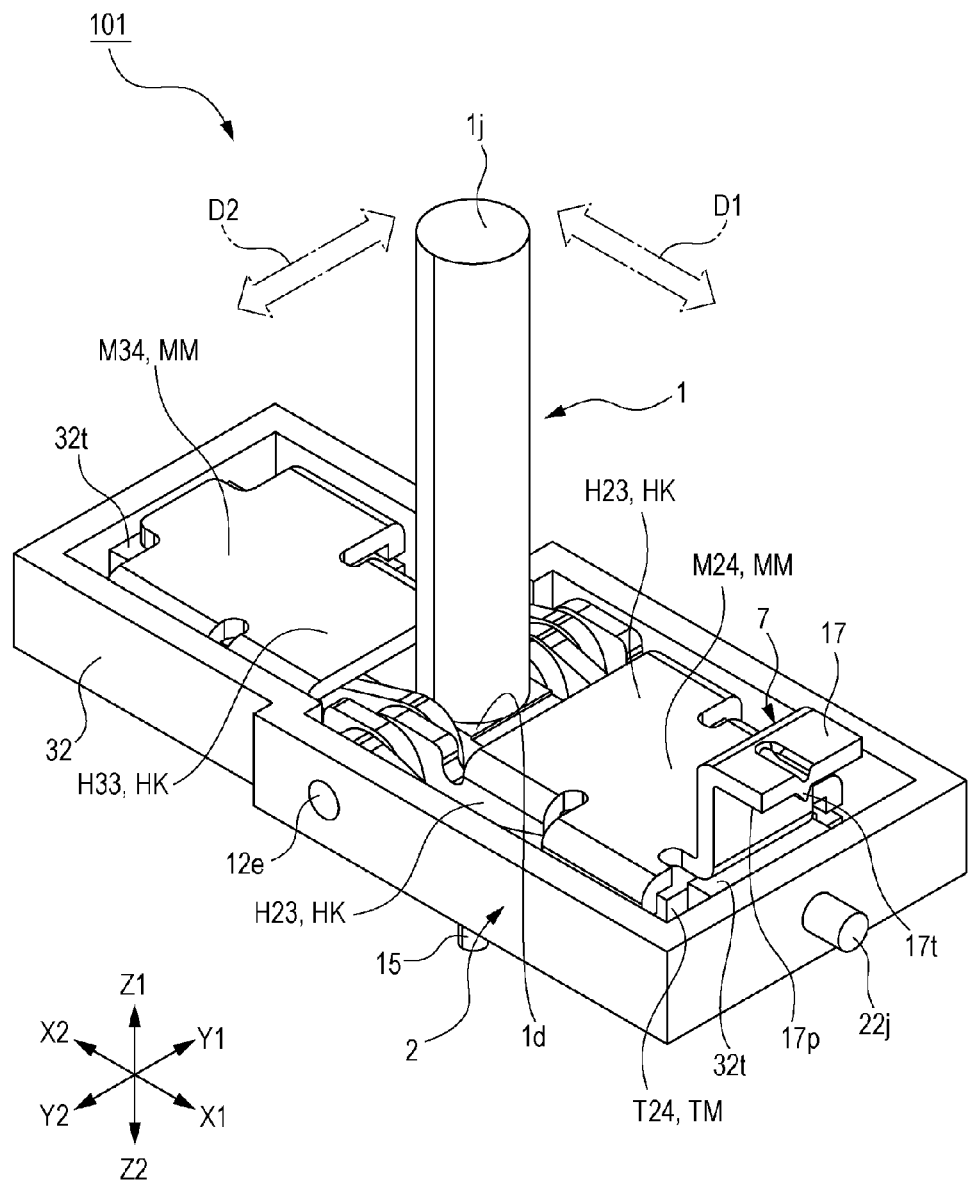
FIG. 6 illustrates the multi-directional operating device according to the first embodiment of the present invention and is a perspective view with a casing of FIG. 5 omitted.
Figure 7:
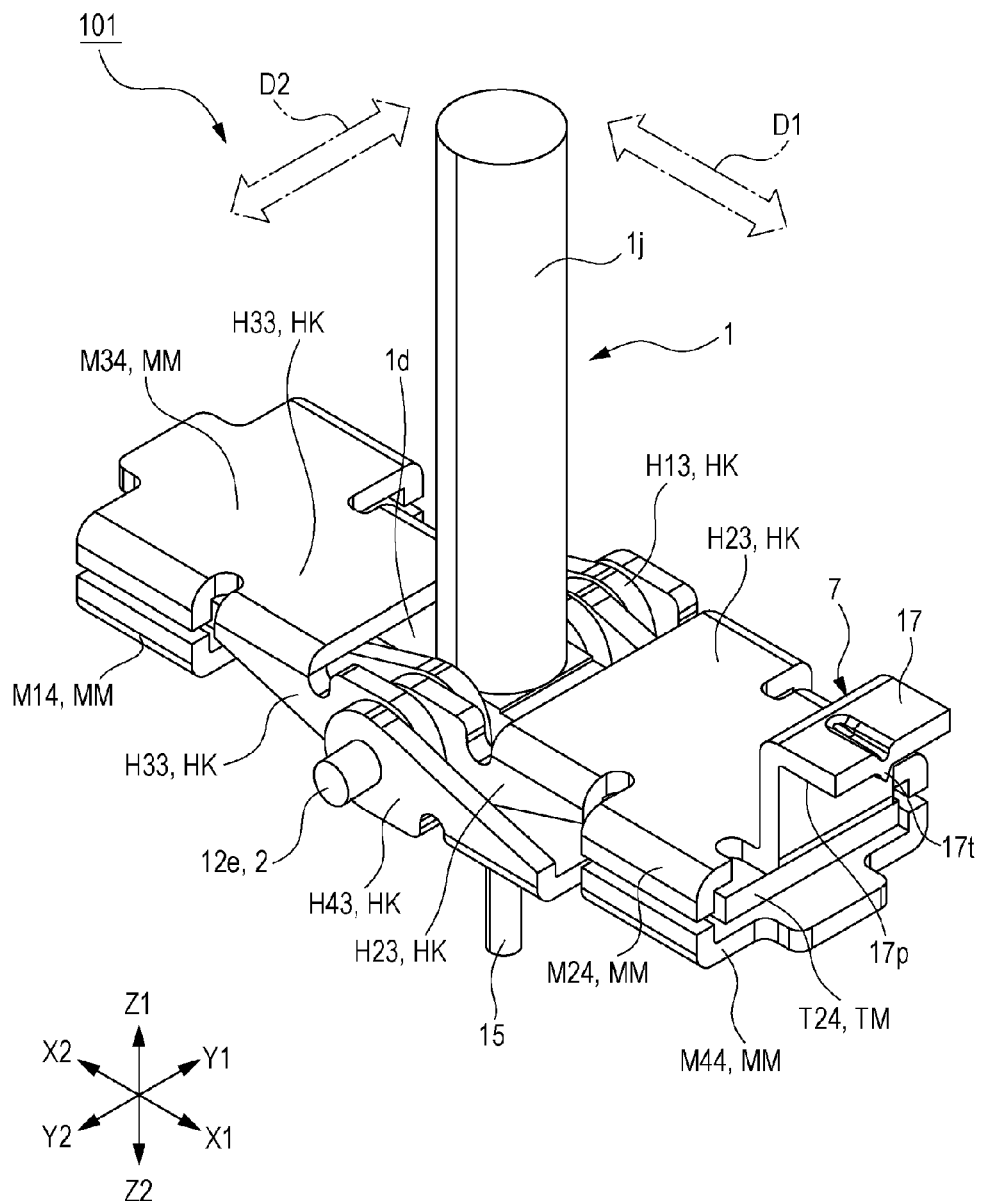
FIG. 7 illustrates the multi-directional operating device according to the first embodiment of the present invention and is a perspective view with a frame and second inclination shaft of FIG. 6 omitted.
Figure 8A:
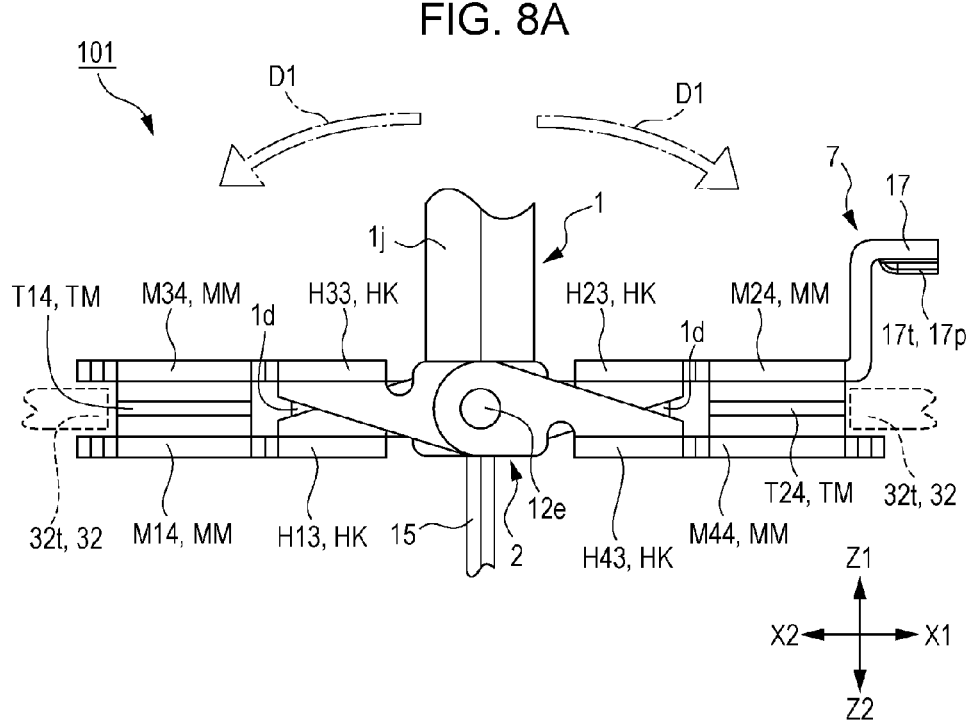
FIGS. 8A and 8B illustrate the multi-directional operating device according to the first embodiment of the present invention, and out of FIGS. 8A and 8B.
Figure 8B:
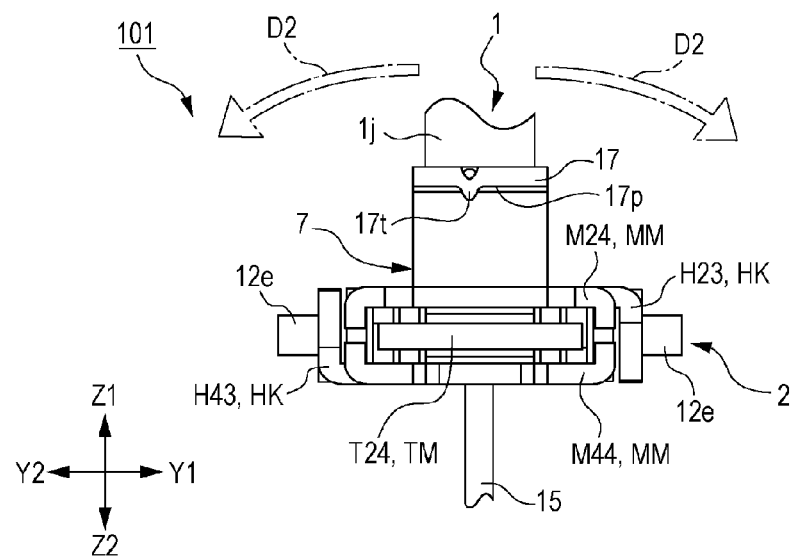

Next, the multi-directional operating device 101 is described. FIG. 5 illustrates the multi-directional operating device 101 according to the first embodiment of the present invention and is a perspective view of a main portion of the multi-directional operating device 101. FIG. 6 is a perspective view of the multi-directional operating device 101 of FIG. 5 with the casing K2 omitted. FIG. 7 is a perspective view of the multi-directional operating device 101 of FIG. 6 with a frame 32 and the second inclination shaft 22j omitted. FIG. 8A is a front view of the multi-directional operating device 101 seen from the Y2 side of FIG. 7, and FIG. 8B is a side view of the multi-directional operating device 101 seen from the X1 side of FIG. 7. In FIGS. 5 to 8B, the operating member 1 is at the first position P1 in the second direction D2 and at the reference position without being subjected to the inclination operation in the first direction D1.

As illustrated in FIGS. 5 to 8B, the multi-directional operating device 101 according to the first embodiment of the present invention includes the following components: the operating member 1 that can be inclined due to operation performed by the operator; the support body 2 (see FIG. 3) that supports the operating member 1 such that the operating member 1 can be inclined; a plurality of movable members HK that are inclined in the first direction D1 (X direction of FIG. 8A) corresponding to the inclination of the operating member 1; a pair of movable magnetic members MM that are provided in the respective movable members HK and that face each other; a facing magnetic member TM that is disposed between the pair of movable magnetic members MM facing each other; a plurality of stopper portions 6 (see FIGS. 10A to 12C to be referred to later) that stop the inclination of the movable magnetic members MM; a drive member 7 provided in one of the movable magnetic members MM; and a cam member 8 that is provided in the support body 2 and faces one side of the drive member 7. The multi-directional operating device 101 is operable, due to inclination operations performed by the operator, in the multiple directions, that is, the multi-directional operating device 101 can be inclined in the first direction D1 being the front-rear direction (X1 and X2 directions of FIGS. 4A and 4B) and inclined in the second direction D2 being the left-right direction (Y1 and Y2 directions of FIGS. 4A and 4B) that intersects (at a right angle according to the first embodiment of the present invention) the first direction D1.

Initially, the operating member 1 of the multi-directional operating device 101 is described. FIGS. 9A and 9B illustrate the operating member 1, and out of FIGS. 9A and 9B, FIG. 9A is a perspective view of the operating member 1, and FIG. 9B is a front view of the operating member 1 when the operating member 1 of FIG. 9A is seen from the Y2 side.

The operating member 1 is produced by forming a synthetic resin material such as PBT, and preferably includes, as illustrated in FIGS. 9A and 9B, the rod-shaped operating shaft 1j that extends in the vertical direction (Z direction of FIG. 6). Also, the operating member 1 preferably includes a base portion 1d that is provided on the other side of the operating shaft 1j and extends along a flat plane through which the shaft axis of the operating shaft 1j extends. As has been described, the operating shaft 1j of the operating member 1 is covered with the shift knob 50N of the vehicle shift apparatus 500. Although the operating member 1 is formed of a synthetic resin material, this is not limiting. The operating member 1 may be formed of, for example, a metal material such as zinc (Zn).

Furthermore, as illustrated in FIGS. 9A and 9B, a cylindrical guide projection 15 is preferably provided. The guide projection 15 is integrally formed with the operating member 1 so as to extend downward (Z2 direction of FIGS. 9A and 9B) from the base portion 1d. Since the guide projection 15 is integrated with the operating member 1, the guide projection 15 is inclined as the operating member 1 is inclined.

As illustrated in FIGS. 9A and 9B, the operating shaft 1j of the operating member 1 has a cylindrical shape and is integrally formed with the base portion 1d. Furthermore, as illustrated in FIGS. 2A and 2B, an upper portion (portion exposed from the upper surface of the cover K5) of the operating shaft 1j is covered by and engaged with the shift knob 50N. Since a generally widely used engagement structure can be applied to an engagement structure of the operating shaft 1j with the shift knob 50N, the detailed description thereof is omitted.

As illustrated in FIGS. 9A and 9B, the base portion 1d of the operating member 1 extends from the operating shaft 1j to the left and to the right (X1 and X2 directions of FIGS. 9A and 9B) and has a through hole 1h that is formed at its central portion and extends in a direction (Y direction of FIG. 9A) perpendicular to the direction (X direction of FIGS. 9A and 9b) in which the base portion 1d extends. The inclination shaft 12e (first inclination shaft) of the support body 2, the support body 2 allowing the operating member 1 to be inclined, is inserted through and fitted into this through hole 1h. Furthermore, the base portion 1d is inclined as the operating member 1 is inclined in the first direction D1 (X direction of FIGS. 9A and 9B). In so doing, the above-described guide projection 15, which is provided on the opposite side of the inclination shaft 12e (first inclination shaft) to the operating shaft 1j, is rotated in the opposite direction to the inclination direction of the operating shaft 1j.

Furthermore, as illustrated in FIG. 8A, in a state in which the multi-directional operating device 101 is assembled, the base portion 1d is disposed between the plurality of movable members HK and, when the base portion 1d is rotated about the inclination shaft 12e as the shaft axis, is brought into contact with the movable members HK. As illustrated in FIG. 9B, the base portion 1d preferably includes a first pressure portion 11p, which faces and parallel to one of the movable members HK (first movable member H13 which will be described later), and a second pressure portion 21p, which faces and inclined relative to another of the movable members HK (second movable member H23 which will be described later). The first pressure portion 11p and the second pressure portion 21p are provided on both sides of the operating shaft 1j with the inclination shaft 12e interposed therebetween. Furthermore, according to the first embodiment of the present invention, the base portion 1d also preferably includes a third pressure portion 31p, which faces and parallel to still another of the movable members HK (third movable member H33 which will be described later), and a fourth pressure portion 41p, which faces and inclined relative to still another of the movable members HK (fourth movable member H43 which will be described later). As is the case with the first pressure portion 11p and the second pressure portion 21p, the third pressure portion 31p and the fourth pressure portion 41p are provided on both sides of the operating shaft 1j with the inclination shaft 12e interposed therebetween.

Figure 10A:
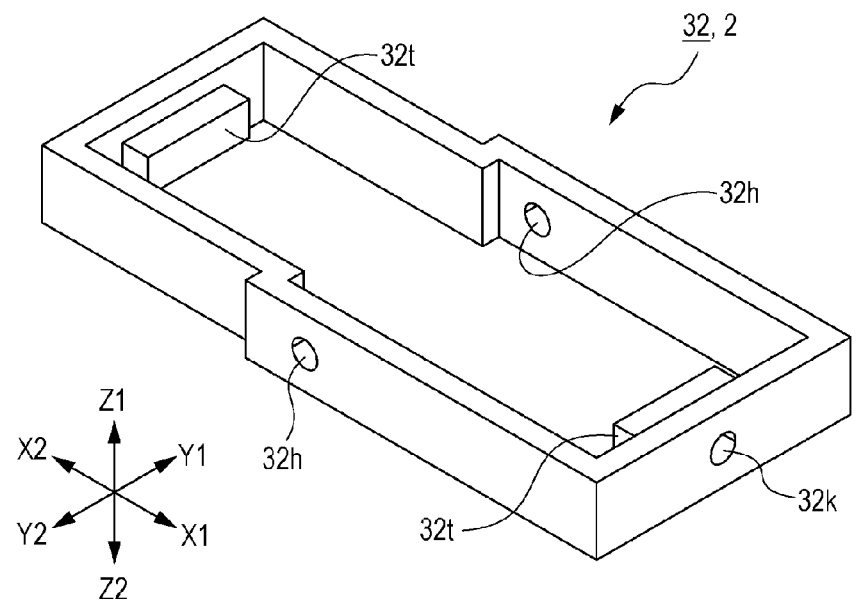
FIGS. 10A and 10B illustrate a support body of the multi-directional operating device according to the first embodiment of the present invention, and out of FIGS. 10A and 10B.
Figure 10B:
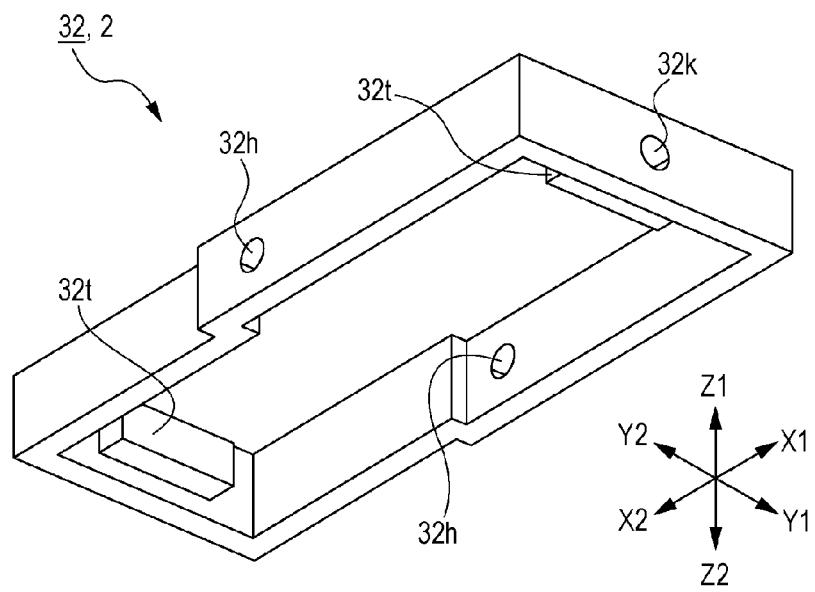

Next, the support body 2 of the multi-directional operating device 101 is described. FIG. 10A is a top perspective view of the frame 32 of the support body 2, and FIG. 10B is a bottom perspective view of the frame 32 of the support body 2.

As illustrated in FIG. 6, the support body 2 preferably mainly includes the inclination shaft 12e (first inclination shaft) that allows the operating member 1 to be inclined (inclination in the first direction D1). The support body 2 also mainly includes the following components: the second inclination shaft 22$j$ the axial direction of which is perpendicular to that of the inclination shaft 12$e$, the frame 32 that is rotated about the second inclination shaft 22$j$ as the rotational center in accordance with the inclination operation (inclination in the second direction D2) of the operating member 1; and the bearings 42$k$ (see FIG. 3) which are provided in the casing K2 and through which the second inclination shaft 22$j$ is inserted so as to support the frame 32 such that the frame 32 is rotatable.

Initially, the inclination shaft 12$e$ of the support body 2 is formed of a soft magnetic material such as iron and has a cylindrical shape. In the state in which the multi-directional operating device 101 is assembled, the inclination shaft 12$e$ is inserted through the through hole 1$h$ of the base portion 1$d$ of the operating member 1 so as to be fitted into the operating member 1 and engaged with the plurality of movable members HK so as to support the movable members HK such that the movable members HK can be inclined in the first direction D1 (X direction of FIG. 6).

Next, the second inclination shaft 22$j$ of the support body 2 is formed of a soft magnetic material such as iron. As illustrated in FIG. 6, the second inclination shaft 22$j$ has a cylindrical shape and inserted into and fixed to the frame 32 (holes 32$k$ which will be described later). In a state in which the multi-directional operating device 101 is assembled, the second inclination shaft 22$j$ is rotatably inserted into the bearings 42$k$ of the casing K2.

Next, the frame 32 of the support body 2 is produced by forming a synthetic resin material such as PBT. As illustrated in FIGS. 10A and 10B, the frame 32 has a rectangular frame shape and is open at its top and bottom so as to have opening portions. In a state in which the multi-directional operating device 101 is assembled, the base portion 1$d$ of the operating member 1, the plurality of movable members HK, the plurality of movable magnetic members MM, and a plurality of facing magnetic members TM are housed in a housing portion of the frame 32.

Furthermore, as illustrated in FIGS. 10A and 10B, the frame 32 has holes 32$h$ in respective long-side walls that face each other. The inclination shaft 12$e$ is inserted through these holes 32$h$ (see FIG. 6) so as to be rotatably supported by the frame 32. Thus, the operating shaft 1$j$ of the operating member 1 can be rotated about the inclination shaft 12$e$ as the shaft axis (rotational center) in the first direction D1, and the base portion 1$d$ of the operating member 1 can also be rotated about the inclination shaft 12$e$ as the shaft axis. In contrast, the frame 32 is not moved in accordance with the inclination of the operating member 1 in the first direction D1 and is not inclined in the first direction D1.

Furthermore, as illustrated in FIGS. 10A and 10B, the frame 32 has the holes 32$k$ in side walls (short-side walls) in the longitudinal direction (X direction of FIGS. 10A and 10B) of the frame 32. As has been described, the second inclination shaft 22$j$ is inserted through the holes 32$k$ so as to be fitted into the holes 32$k$ (see FIG. 6). In a state in which the multi-directional operating device 101 is assembled, the second inclination shaft 22$j$ is inserted into the bearings 42$k$ provided in the casing K2 so as to be rotatably supported by the bearings 42$k$ (see FIG. 3). In this way, the frame 32 can be rotated about the second inclination shaft 22$j$ as the rotational center (shaft axis) in the second direction D2, and the operating member 1, which is engaged with the frame 32 through the inclination shaft 12$e$, can also be rotated about the second inclination shaft 22$j$ as the shaft axis. From the above description, the support body 2 supports the operating member 1 such that the operating member 1 can be inclined in the multiple directions (first direction D1 and second direction D2) by using the inclination shaft (first inclination shaft) 12$e$, the second inclination shaft 22$j$, the frame 32, and the bearings 42$k$.

Furthermore, as illustrated in FIGS. 10A and 10B, the frame 32 has projections 32$t$ that are formed on the respective short-side walls facing each other so as to project toward the inside of the housing portion within the frame 32. Although it is not illustrated in detail, in a state in which the multi-directional operating device 101 is assembled, these projections 32$t$ are inserted into spaces between pairs of the movable magnetic members MM (see FIG. 8A).

Next, the movable members HK and the movable magnetic members MM of the multi-directional operating device 101 are described. The movable members HK of the multi-directional operating device 101 according to the first embodiment of the present invention are preferably formed of a soft magnetic material such as iron. The movable magnetic members MM of the multi-directional operating device 101 according to the first embodiment of the present invention are formed of a soft magnetic material such as iron. As illustrated in FIG. 7, the movable members HK and the movable magnetic members MM are preferably integrally formed. In this way, the number of components of the multi-directional operating device 101 can be reduced, and the thickness of this portion of the multi-directional operating device 101 can be reduced. Although it is preferable that the movable members HK and the movable magnetic members MM be integrally formed according to the first embodiment of the present invention, this is not limiting. The movable members HK and the movable magnetic members MM may be separately formed.

Initially, the movable members HK of the multi-directional operating device 101 preferably includes the first movable member H13 that faces the first pressure portion 11$p$ of the base portion 1$d$, the second movable member H23 that faces the second pressure portion 21$p$ of the base portion 1$d$, the third movable member H33 that faces the third pressure portion 31$p$ of the base portion 1$d$, and the fourth movable member H43 that faces the fourth pressure portion 41$p$ of the base portion 1$d$. Inclinations of the plurality of movable members HK are coupled with the inclination of the base portion 1$d$ caused by the inclination operation of the operating member 1.

As illustrated in FIG. 8A, the first movable member H13 and the second movable member H23 of the movable members HK are disposed with the inclination shaft 12$e$ of the support body 2 interposed therebetween, and one end side of the first movable member H13 and one end side of the second movable member H23 are rotatably loosely fitted onto the inclination shaft 12$e$ so as to be rotated about the inclination shaft 12$e$. When the inclination operation toward one side in the first direction D1 (X2 direction of FIG. 8A) is performed on the operating member 1, the first movable member H13 that faces the first pressure portion 11$p$ (see FIGS. 9A and 9B) is pressed by the first pressure portion 11$p$ of the base portion 1$d$ that is inclined in an inclination operation direction of the base portion 1$d$ (toward one side in the inclination operation direction). Furthermore, when the inclination operation toward the one side is continued, the second movable member H23 that faces the second pressure portion 21$p$ is pressed by the second pressure portion 21$p$ (see FIGS. 9A and 9B) of the base portion 1$d$ disposed on the opposite side (X1 direction side of FIG. 8A) of the inclination shaft 12$e$ to the first pressure portion 11$p$ side (X2 direction side of FIG. 8A).

Furthermore, according to the first embodiment of the present invention, as illustrated in FIG. 8A, the third movable member H33 and the fourth movable member H43 of the movable members HK are disposed with the inclination shaft 12e of the support body 2 interposed therebetween, and one end side of the third movable member H33 and one end side of the fourth movable member H43 are rotatably loosely fitted onto the inclination shaft 12e so as to be rotated about the inclination shaft 12e. When the inclination operation toward another side in the first direction D1 (X1 direction of FIG. 8A) is performed on the operating member 1, the third movable member H33 that faces the third pressure portion 31p (see FIGS. 9A and 9B) is pressed by the third pressure portion 31p of the base portion 1d that is inclined in the inclination operation direction of the base portion 1d (toward another side in the inclination operation direction). Furthermore, when the inclination operation toward the other side is continued, the fourth movable member H43 that faces the fourth pressure portion 41p is pressed by the fourth pressure portion 41p (see FIGS. 9A and 9B) of the base portion 1d disposed on the opposite side (X1 direction side of FIG. 8A) of the inclination shaft 12e to the third pressure portion 31p side (X2 direction side of FIG. 8A).

Next, the movable magnetic members MM of the multi-directional operating device 101 preferably includes, as illustrated in FIG. 7, a first movable magnetic member M14 provided in (integrated with) the first movable member H13, a second movable magnetic member M24 provided in (integrated with) the second movable member H23, a third movable magnetic member M34 provided in (integrated with) the third movable member H33, and a fourth movable magnetic member M44 provided in (integrated with) the fourth movable member H43. The first movable magnetic member M14 and the third movable magnetic member M34 form a pair with one of the facing magnetic members TM (first facing magnetic member T14 which will be described later) interposed therebetween, and the second movable magnetic member M24 and the fourth movable magnetic member M44 form a pair with another of the facing magnetic members TM (second facing magnetic member T24 which will be described later) interposed therebetween. When the operating member 1 is at the reference position, in each of the pairs of the movable magnetic members MM, the movable magnetic members MM are disposed close to each other and attracted to each other. Although it appears that certain gaps are formed between the movable magnetic members MM and the facing magnetic members in FIG. 8B, there actually are cushioning members (not illustrated) provided on the movable magnetic member MM side or the facing magnetic member TM side in order to suppress contact sounds generated when the movable magnetic members MM and the facing magnetic members TM are brought into direction contact with one another.

Furthermore, as illustrated in FIG. 7, the entirety of the movable magnetic members MM (first movable magnetic member M14, second movable magnetic member M24, third movable magnetic member M34, and fourth movable magnetic member M44) has a rectangular plate shape. In addition, as illustrated in FIGS. 7 and 8B, both the end sides of each of the movable magnetic members MM are preferably bent so that end surfaces of the movable magnetic members MM face one another. Thus, in each of the pairs of the movable magnetic members MM, the movable magnetic members MM surround the facing magnetic member TM (permanent magnet), thereby confining a magnetic flux generated by the facing magnetic member TM (permanent magnet) between each of the pairs of movable magnetic members MM. This can increase attracting forces between the movable magnetic members MM in each of the pair.

Furthermore, as illustrated in FIGS. 6, 7, and 8A, the second movable magnetic member M24, which is one of the movable magnetic members MM, includes the drive member 7 that extends upward from an end portion of the second movable magnetic member M24. The drive member 7 will be described later together with the cam member 8 that faces the one side of the drive member 7 in description of movements in the second direction D2.

Next, the facing magnetic members TM of the multi-directional operating device 101 are described. The facing magnetic members TM are each formed of a rectangular plate-shaped permanent magnet. As illustrated in FIG. 8A, the facing magnetic members TM include the first facing magnetic member T14 disposed on the first movable magnetic member M14 (third movable magnetic member M34) side and the second facing magnetic member T24 disposed on the second movable magnetic member M24 (fourth movable magnetic member M44) side with the base portion 1d of the operating member 1 interposed therebetween.

Furthermore, according to the first embodiment of the present invention, the first facing magnetic member T14 is secured to the first movable magnetic member M14 and the second facing magnetic member T24 is secured to the fourth movable magnetic member M44. This causes the first facing magnetic member T14 to be inclined as the first movable magnetic member M14 is inclined and the second facing magnetic member T24 to be inclined as the fourth movable magnetic member M44 is inclined.

Next, the stopper portions 6 of the multi-directional operating device 101 are described. The stopper portions 6 have the function of stopping the inclination of the other of the movable magnetic members MM in each pair of movable magnetic members MM when the operating member 1 is inclined in the first direction D1 from the reference position (first position P1 or second position P2) so as to be positioned at a plurality of next positions. That is, according to the first embodiment of the present invention, the stopper portions 6 are provided in the projections 32t provided in the frame 32 of the support body 2.

Figure 11A:
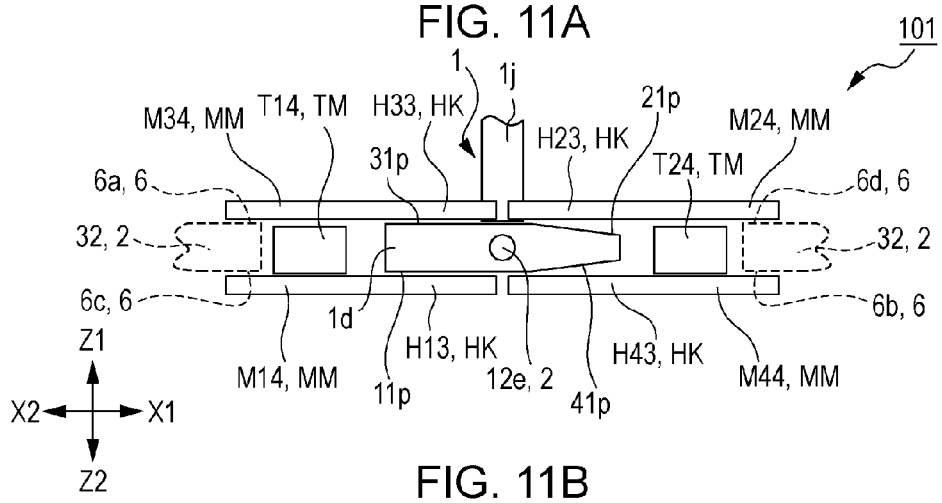
FIGS. 11A to 11C are schematic views illustrating movements in the multi-directional operating device according to the first embodiment of the present invention, and out of FIGS. 11A to 11C.
Figure 11B:
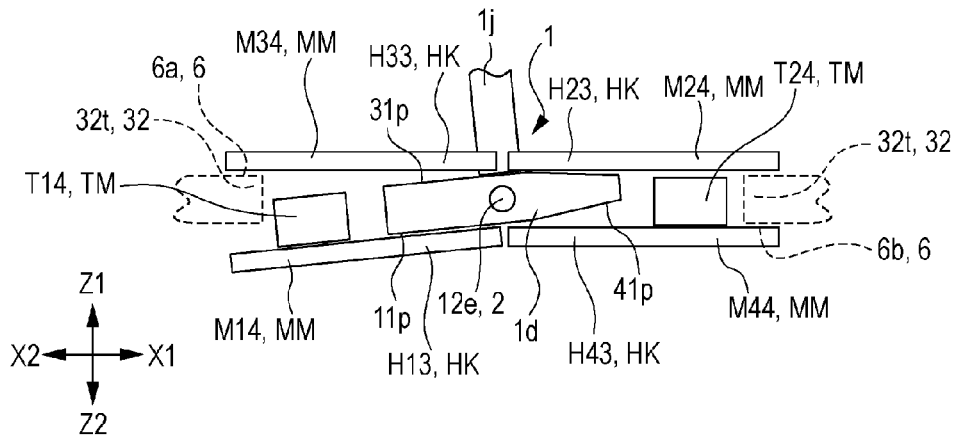
Figure 11C:
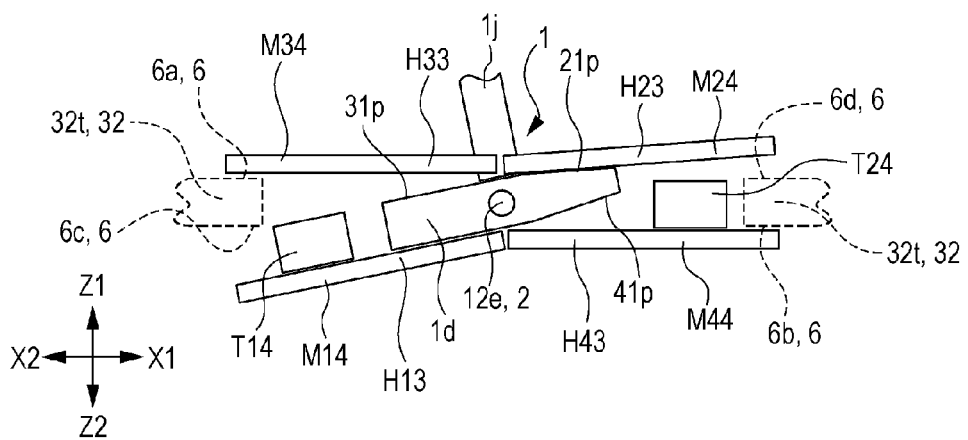
Figure 12A:
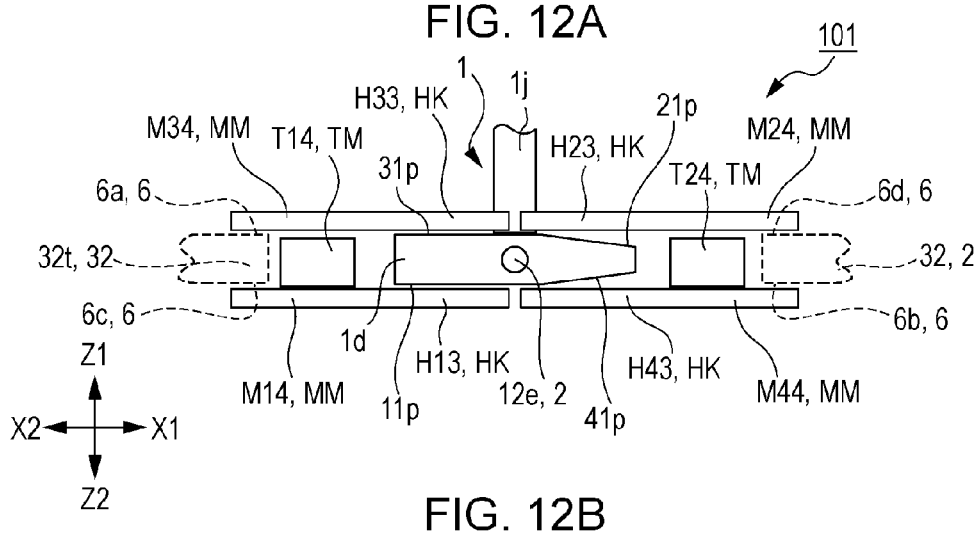
FIGS. 12A to 12C are schematic views illustrating the movements in the multi-directional operating device according to the first embodiment of the present invention, and out of FIGS. 12A to 12C.
Figure 12B:
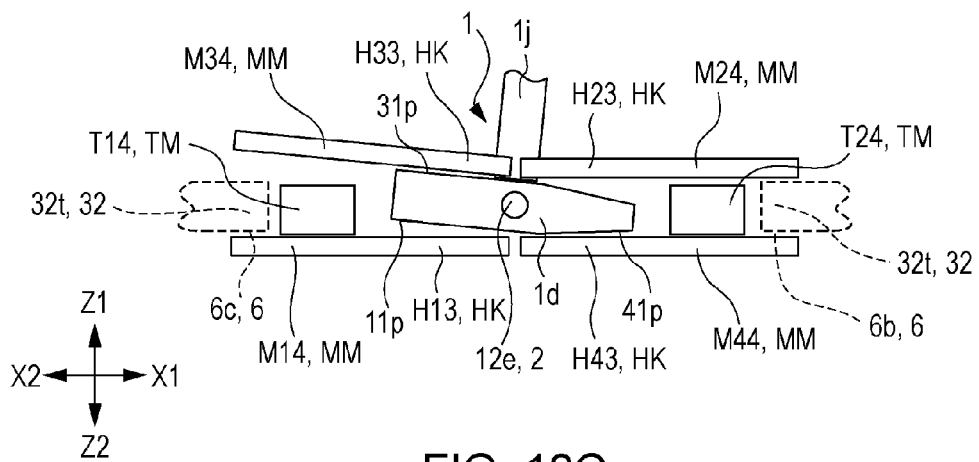
Figure 12C:
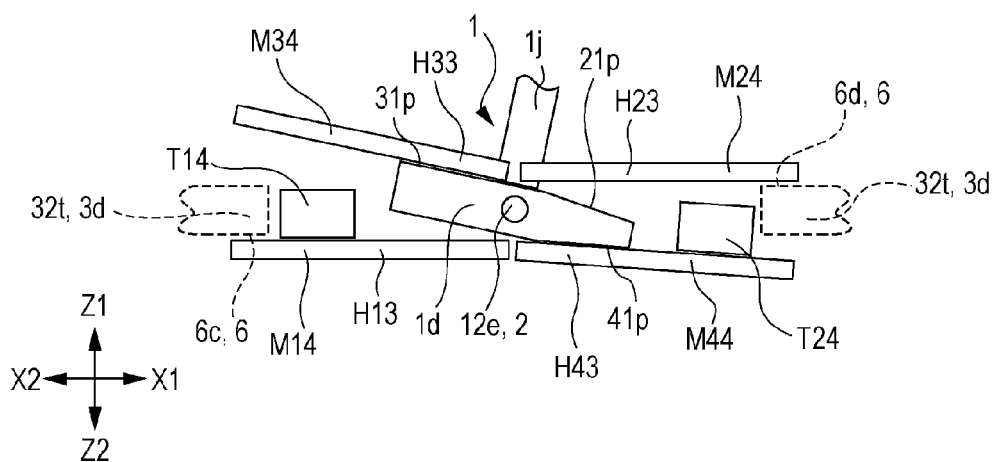

Referring to schematic views of FIGS. 8A, 11A to 11C, and 12A to 12C, the details of the stopper portions 6 are described below by describing movements in the first direction D1 in the multi-directional operating device 101. Furthermore, in terms of the movements in the first direction D1, movements caused by the inclination operation performed by the operator with the reference position set at the second position (see FIG. 4B) are described in detail. FIGS. 11A to 11C are schematic views illustrating the movements in the first direction D1 in the multi-directional operating device 101 according to the first embodiment of the present invention, and out of FIGS. 11A to 11C, FIG. 11A illustrates a state at the reference position, FIG. 11B illustrates a state of the inclination toward one side (X2 direction of FIGS. 11A to 11C), and FIG. 11C illustrates a state where the inclination is performed further toward the one side than in the state of FIG. 11B. FIGS. 12A to 12C are schematic views illustrating the movements in the first direction D1 in the multi-directional operating device 101 according to the first embodiment of the present invention, and out of FIGS. 12A to 12C, FIG. 12A illustrates a state at the same reference position as that of FIG. 11A, FIG. 12B illustrates a state of the inclination toward the other side (X1 direction of FIGS. 12A to 12C), and FIG. 12C illustrates a state where the inclination is performed further toward the other side than in the state of FIG. 12B. For ease of understanding of description, the guide projection 15 and the drive member 7 are omitted from FIGS. 11A to 12C.

Initially, inclination of the operating member 1 toward the one side (X2 direction of FIGS. 11A to 11C) in the first direction D1 is described with reference to FIGS. 11A to 11C. When the operating member 1 is at the second position P2 as the reference position, as illustrated in FIG. 11A, the base portion 1d of the operating member 1 is maintained parallel to the X direction and four movable members HK (first movable member H13, second movable member H23, third movable member H33, and fourth movable member H43) that face the base portion 1d are also maintained parallel to the X direction. Furthermore, the first movable magnetic member M14 and the third movable magnetic member M34 provided in (integrated with) two movable members HK, respectively, out of four movable members HK are disposed close to each other and face each other with the first facing magnetic member T14 interposed therebetween, and the second movable magnetic member M24 and the fourth movable magnetic member M44 provided in (integrated with) two movable members HK, respectively, out of four movable members HK are disposed close to each other and face each other with the second facing magnetic member T24 interposed therebetween. Thus, when the operating member 1 is at the reference position (second position P2), all the movable magnetic members MM are attracted to and pulled toward one another with the facing magnetic members TM interposed therebetween. This can suppress play of the operating member 1.

Next, when the operator performs the inclination operation on the operating member 1 from the reference position (second position P2) of FIG. 11A toward the one side (X2 direction of FIG. 11A), the operating member 1 is rotated about the inclination shaft 12e as the rotational center. This causes the first pressure portion 11p (see FIGS. 9A and 9B) of the base portion 1d existing on the inclination operation side (X2 direction side of FIG. 11B) to press the first movable member H13 that faces the first pressure portion 11p, thereby rotating the first movable member H13 downward. The first movable magnetic member M14 provided in the first movable member H13 is also rotated and inclined toward the one side.

Meanwhile, the third movable magnetic member M34 being the other of the pair of the first movable magnetic member M14 and the third movable magnetic member M34 has been strongly pulled toward the first facing magnetic member T14 through the cushioning member. However, the inclination of the third movable magnetic member M34 toward the one side is stopped by one of the projections 32t provided in the frame 32. Thus, as illustrated in FIG. 11B, the first movable magnetic member M14 and the third movable magnetic member M34 are separated from each other, and accordingly, a strong attraction state of the first movable magnetic member M14 and the third movable magnetic member M34 changes to a weak attraction state. In so doing, the operating member 1 is moved from the second position P2 to the first front position S21 (see FIG. 4B), and tactile sensation (clicking sensation) can be provided to the operator in the movement from the second position P2 to the first front position S21. According to the first embodiment of the present invention, the inclination of the third movable magnetic member M34 is stopped by the projection 32t provided on the one side, and more specifically, a surface of the projection 32t facing the third movable magnetic member M34. This surface serves as one of the stopper portions 6 (referred to as "stopper portion 6a" for ease of description).

When the operator continues the inclination operation from the position of FIG. 11B (first front position S21) further toward the one side (X2 direction), the operating member 1 is further rotated. This causes the second pressure portion 21p (see FIGS. 9A and 9B) of the base portion 1d existing on the opposite side to the inclination operation side (X1 direction side of FIG. 11B) to press the second movable member H23 that faces the second pressure portion 21p, thereby rotating the second movable member H23 upward. The second movable magnetic member M24 provided in the second movable member H23 is also rotated and inclined toward the one side.

Meanwhile, the fourth movable magnetic member M44 being the other of the pair of the second movable magnetic member M24 and the fourth movable magnetic member M44 has been strongly pulled toward the second facing magnetic member T24 through the cushioning member. However, the inclination of the fourth movable magnetic member M44 toward the one side is stopped by the other of the projections 32t provided in the frame 32. Thus, as illustrated in FIG. 11C, the second movable magnetic member M24 and the fourth movable magnetic member M44 are separated from each other, and accordingly, a strong attraction state of the second movable magnetic member M24 and the fourth movable magnetic member M44 changes to a weak attraction state. In so doing, the position of the operating member 1 is moved from the first front position S21 to the second front position S22 (see FIG. 4B), and tactile sensation (clicking sensation) can be provided to the operator in the movement from the first front position S21 to the second front position S22. According to the first embodiment of the present invention, the inclination of the fourth movable magnetic member M44 is stopped by the projection 32t provided on the other side, and more specifically, a surface of the projection 32t facing the fourth movable magnetic member M44. This surface serves as one of the stopper portions 6 (referred to as "stopper portion 6b" for ease of description).

The multi-directional operating device 101 according to the first embodiment of the present invention having the above-described structure includes, as illustrated in FIGS. 11A to 11C, the stopper portions 6 corresponding to the plurality of positions when the operating member 1 is inclined from the reference position (second position P2) to the plurality of positions. Specifically, the stopper portion 6a is provided corresponding to the first front position S21 of FIG. 4B and the stopper portion 6b is provided corresponding to the second front position S22 of FIG. 4B.

Thus, for example, when changing from the reference position (second position P2) to the next position (first front position S21) and changing from the next position (first front position S21) to the position after the next position (second front position S22), in a corresponding one of the pairs of the movable magnetic members MM, the inclination of one of the movable magnetic members MM toward the one side is continued and the inclination of the other of the movable magnetic members MM is stopped by a corresponding one of the stopper portions 6 (6a, 6b). Accordingly, at each of the positions, a corresponding one of the pairs of movable magnetic members MM are pulled away from and separated from one another, and in so doing, the strong attraction state changes to the weak attraction state. This change can provide tactile sensation to the operator. Thus, compared to the related art example, the multi-directional operating device

101 having good durability can be provided because of the absence of a sliding mechanism in a portion where the tactile sensation is produced.

Furthermore, in each pair of movable magnetic members MM, the permanent magnet (facing magnetic member TM) is interposed between the pair of movable magnetic members MM so that the pair of movable magnetic members MM are separated from each other. Thus, contactless tactile sensation can be obtained with a minimum number (one) of permanent magnets. Thus, the number of expensive permanent magnets can be reduced as much as possible, and accordingly, the multi-directional operating device 101 can be produced at a low cost.

Furthermore, the multi-directional operating device 101 according to the first embodiment of the present invention is specifically structured as follows: when the inclination operation toward the one side (X2 direction of FIGS. 11A to 11O) is performed on the operating member 1, the first pressure portion 11$p$ of the base portion 1$d$ presses the first movable member H13, the first movable magnetic member M14 provided in the first movable member H13 is inclined, and the inclination of the third movable magnetic member M34 provided in the third movable member H33 is stopped by one of the stopper portions 6 (6$a$); furthermore, when the inclination operation toward the one side (inclination operation direction) is continued, the second pressure portion 21$p$ presses the second movable member H23, the second movable magnetic member M24 provided in the second movable member H23 is inclined, and the inclination of the fourth movable magnetic member M44 provided in the fourth movable member H43 is stopped by one of the stopper portions 6 (6$b$). Thus, the first movable magnetic member M14 being inclined and the third movable magnetic member M34 stopped by the stopper portion 6$a$ are easily separated from each other, and when the inclination operation is further continued toward the one side, the second movable magnetic member M24 being inclined and the fourth movable magnetic member M44 stopped by the stopper portion 6$b$, which are on the opposite side of the inclination shaft 12$e$ to the first movable magnetic member M14 and the third movable magnetic member M34, are easily separated from each other. Thus, corresponding to the respective positions (first front position S21 and second front position S22), the pair of the first movable magnetic member M14 and the third movable magnetic member M34 can easily be separated and the pair of the second movable magnetic member M24 and the fourth movable magnetic member M44 can easily be separated. Accordingly, the multi-directional operating device 101 providing tactile sensation can be easily produced.

Meanwhile, the multi-directional operating device 101 according to the first embodiment of the present invention has a similar structure also for the inclination operation toward the other side (X1 direction of FIG. 11A) performed on the operating member 1. Thus, inclination of the operating member 1 toward the other side (X1 direction of FIGS. 12A to 12C) in the first direction D1 is described with reference to FIGS. 12A to 12C.

Initially, when the operator performs the inclination operation on the operating member 1 from the reference position (second position P2) of FIG. 12A toward the opposite side (X1 direction of FIG. 12A), the operating member 1 is rotated about the inclination shaft 12$e$ as the rotational center. This causes the third pressure portion 31$p$ (see FIGS. 9A and 9B) of the base portion 1$d$ existing on the opposite side to the inclination operation (X2 direction side of FIG. 12B) to press the third movable member H33 that faces the third pressure portion 31$p$, thereby rotating the third movable member H33 upward. The third movable magnetic member M34 provided in the third movable member H33 is also rotated and inclined toward the other side.

Meanwhile, the first movable magnetic member M14 being the other of the pair of the first movable magnetic member M14 and the third movable magnetic member M34 has been strongly pulled toward the first facing magnetic member T14 through the cushioning member. However, the inclination of the first movable magnetic member M14 toward the other side is stopped by the projection 32$t$ provided in the frame 32. Thus, as illustrated in FIG. 12B, the first movable magnetic member M14 and the third movable magnetic member M34 are separated from each other, and accordingly, the strong attraction state of the first movable magnetic member M14 and the third movable magnetic member M34 changes to the weak attraction state. In so doing, the operating member 1 is moved from the second position P2 to the first rear position S23 (see FIG. 4B), and tactile sensation (clicking sensation) can be provided to the operator in the movement from the second position P2 to the first rear position S23. According to the first embodiment of the present invention, the inclination of the first movable magnetic member M14 is stopped by the projection 32$t$ provided on the one side, and more specifically, a surface of the projection 32$t$ facing the first movable magnetic member M14. This surface serves as one of the stopper portions 6 (referred to as "stopper portion 6$c$" for ease of description).

When the operator continues the inclination operation from the position of FIG. 12B (first rear position S23) further toward the other side (X1 direction), the operating member 1 is further rotated. This causes the fourth pressure portion 41$p$ (see FIGS. 9A and 9B) of the base portion 1$d$ existing on the inclination operation side (X1 direction side of FIG. 12B) to press the fourth movable member H43 that faces the fourth pressure portion 41$p$, thereby rotating the fourth movable member H43 downward. The fourth movable magnetic member M44 provided in the fourth movable member H43 is also rotated and inclined toward the other side.

Meanwhile, the second movable magnetic member M24 being the other of the pair of the second movable magnetic member M24 and the fourth movable magnetic member M44 has been strongly pulled toward the second facing magnetic member T24 through the cushioning member. However, the inclination of the second movable magnetic member M24 toward the other side is stopped by the projection 32$t$ provided in the frame 32. Thus, as illustrated in FIG. 12C, the second movable magnetic member M24 and the fourth movable magnetic member M44 are separated from each other, and accordingly, the strong attraction state of the second movable magnetic member M24 and the fourth movable magnetic member M44 changes to the weak attraction state. In so doing, the position of the operating member 1 is moved from the first rear position S23 to the second rear position S24 (see FIG. 4B), and tactile sensation (clicking sensation) can be provided to the operator in the movement from the first rear position S23 to the second rear position S24. According to the first embodiment of the present invention, the inclination of the second movable magnetic member M24 is stopped by the projection 32$t$ provided on the other side, and more specifically, a surface of the projection 32$t$ facing the second movable magnetic member M24. This surface serves as one of the stopper portions 6 (referred to as "stopper portion 6$d$" for ease of description).

The multi-directional operating device 101 according to the first embodiment of the present invention having the above-described structure is specifically structured as follows: when the inclination operation toward the other side (X1 direction of FIGS. 12A to 12C) is performed on the operating member 1, the third pressure portion 31p of the base portion 1d presses the third movable member H33, the third movable magnetic member M34 provided in the third movable member H33 is inclined, and the inclination of the first movable magnetic member M14 provided in the first movable member H13 is stopped by one of the stopper portions 6 (6c); furthermore, when the inclination operation toward the other side (inclination operation direction) is continued, the fourth pressure portion 41p presses the fourth movable member H43, the fourth movable magnetic member M44 provided in the fourth movable member H43 is inclined, and the inclination of the second movable magnetic member M24 provided in the second movable member H23 is stopped by the stopper portion 6 (6d). Thus, the third movable magnetic member M34 being inclined and the first movable magnetic member M14 stopped by the stopper portion 6c are easily separated from each other, and when the inclination operation is further continued toward the other side, the fourth movable magnetic member M44 being inclined and the second movable magnetic member M24 stopped by the stopper portion 6d, which are on the opposite side of the inclination shaft 12e to the third movable magnetic member M34 and the first movable magnetic member M14, are easily separated from each other. Thus, corresponding to the respective positions (first rear position S23 and second rear position S24), the pair of the first movable magnetic member M14 and the third movable magnetic member M34 can easily be separated and the pair of the second movable magnetic member M24 and the fourth movable magnetic member M44 can easily be separated. Accordingly, the multi-directional operating device 101 providing tactile sensation can be easily produced.

Furthermore, according to the first embodiment of the present invention, when the operating member 1 is inclined in the X2 direction or the X1 direction so as to separate each of the pairs of movable magnetic members MM (first movable magnetic member M14 and the third movable magnetic member M34, second movable magnetic member M24 and fourth movable magnetic member M44) as illustrated in FIGS. 11B and 11C or FIGS. 12B and 12C, the movable magnetic members MM in each pair are preferably disposed at such positions that attracting forces acting between the pair of movable magnetic members MM are not eliminated. Thus, for example, at each of the positions (first front position S21, second front position S22, first rear position S23, or second rear position S24), when the force of the inclination operation performed by the operator is eliminated, the pair of movable magnetic members MM having been pulled away from each other are attracted to each other again due to the mutual attracting forces. This allows the operating member 1 to be automatically returned to the reference position (second position P2) without use of a returning member for automatic return.

Alternatively, instead of the above-described relationships of arrangement positions between the plurality of movable magnetic members MM, the plurality of movable magnetic members MM may be arranged in the relationships of arrangement positions as follows: that is, from when the first movable magnetic member M14 and the third movable magnetic member M34 are separated from each other to when the second movable magnetic member M24 and the fourth movable magnetic member M44 are separated from each other, the pair of the first movable magnetic member M14 and the third movable magnetic member M34 are disposed at such positions that the attracting forces acting therebetween are not eliminated; even in the case where the attracting forces acting between the first movable magnetic member M14 and the third movable magnetic member M34 are eliminated when the second movable magnetic member M24 and the fourth movable magnetic member M44 are separated from each other, the pair of the second movable magnetic member M24 and the fourth movable magnetic member M44 are disposed at such positions that the attracting forces acting therebetween are not eliminated. In this way, when the force of the inclination operation performed by the operator is eliminated, the second movable magnetic member M24 and the fourth movable magnetic member M44 are initially pulled toward each other, and next, the first movable magnetic member M14 and the third movable magnetic member M34 are pulled toward each other. This allows the operating member 1 to be automatically returned to the reference position without use of a returning member for automatic return.

In the above description, the movements in the first direction D1 have been described in detail with the second position P2 set as the reference position. Also when the first position P1 is set as the reference position, the similar movements are performed. Thus, the detailed description with the first position P1 set as the reference position is omitted.

Figure 13A:
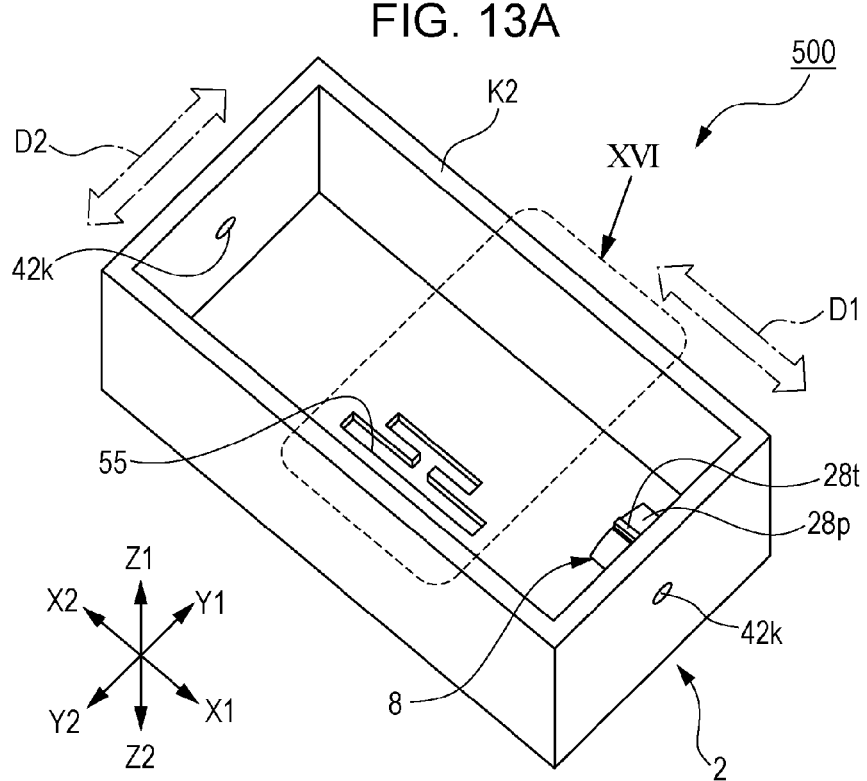
FIGS. 13A and 13B illustrate a cam member of the multi-directional operating device according to the first embodiment of the present invention, and out of FIGS. 13A and 13B.
Figure 13B:
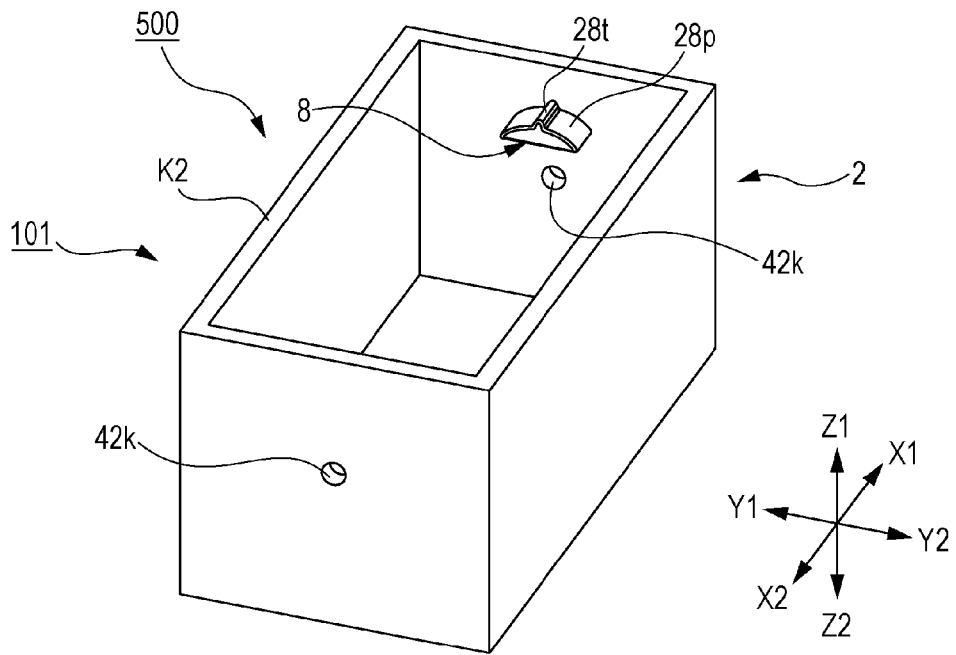

Next, the drive member 7 and the cam member 8 of the multi-directional operating device 101 are described. FIGS. 13A and 13B illustrate the cam member 8, and out of FIGS. 13A and 13B, FIG. 13A is a top perspective view of the casing K2 seen from the X1-Y2 side of FIG. 5, and FIG. 13B is a top perspective view of the casing K2 seen from the X2-Y2 side of FIG. 5. FIGS. 14A and 14B illustrate the drive member 7 and the cam member 8, and out of FIGS. 14A and 14B, FIG. 14A is a partial sectional view taken along line XIVA-XIVA of FIG. 5, and FIG. 14B is a partial sectional view illustrating a state in which the inclination operation is performed on the operating member 1 from a state of FIG. 14A. In a state of FIG. 14A, the operating member 1 is positioned at first position P1. In the state of FIG. 14B, the operating member 1 is positioned at the second position P2.

Initially, the drive member 7 of the multi-directional operating device 101 is integrated with one of the movable magnetic members MM provided in the corresponding movable member HK. Thus, as the operating member 1 is inclined, the movable member HK and the movable magnetic member MM are rotated, and the drive member 7 is rotated at the same time as the movable member HK and the movable magnetic member MM are rotated. Furthermore, specifically according to the first embodiment of the present invention, as illustrated in FIGS. 7 and 8A, the drive member 7 extends upward (Z1 direction of FIG. 8A) from the end portion of the second movable magnetic member M24 (the movable magnetic member MM), and an open end portion side of the drive member 7 is bent so as to be parallel to the second movable magnetic member M24, thereby forming a base 17.

Furthermore, as illustrated in FIGS. 8A and 8B, the base 17 of the drive member 7 has a first projection 17t projecting downward (Z2 direction of FIGS. 8A and 8B). A surface of the base 17 on one side including a surface of the first projection 17t serves as a guide surface 17p.

Next, the cam member 8 of the multi-directional operating device 101 extends, as illustrated in FIGS. 13A and 13B, from one of the side walls of the casing K2 of the vehicle shift apparatus 500 toward the housing portion. In a state in which the multi-directional operating device 101 is assembled, as illustrated in FIGS. 14A and 14B, the cam member 8 faces the one side of the base 17 of the drive member 7.

Furthermore, as illustrated in FIGS. 13A and 13B, the cam member 8 has a second projection 28t projecting upward (Z1 direction of FIGS. 13A and 13B). This second projection 28t faces the first projection 17t of the drive member 7 as illustrated in FIGS. 14A and 14B. A surface of the cam member 8 including a surface of the second projection 28t (surface facing the one side of the base 17 of the drive member 7) serves as a sliding surface 28p. According to the first embodiment of the present invention, this side wall of the casing K2 is utilized as the support body 2 that includes the cam member 8.

Figure 15A:
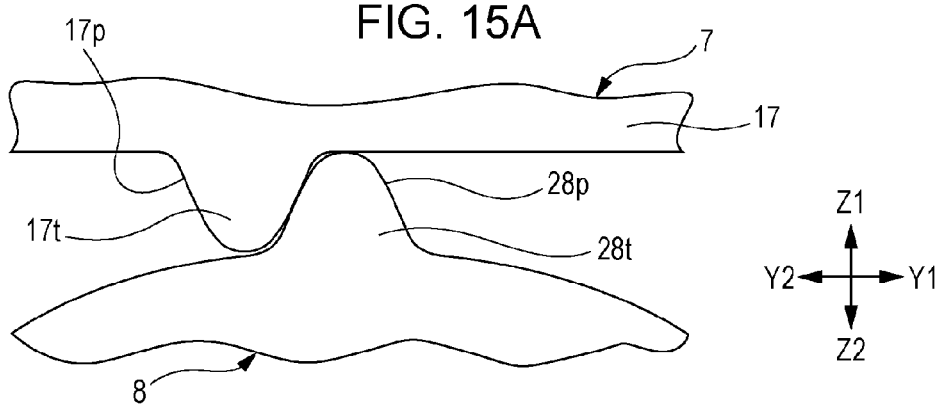
FIGS. 15A to 15C are schematic views illustrating movements in the multi-directional operating device according to the first embodiment of the present invention, and out of FIGS. 15A to 15C.
Figure 15B:
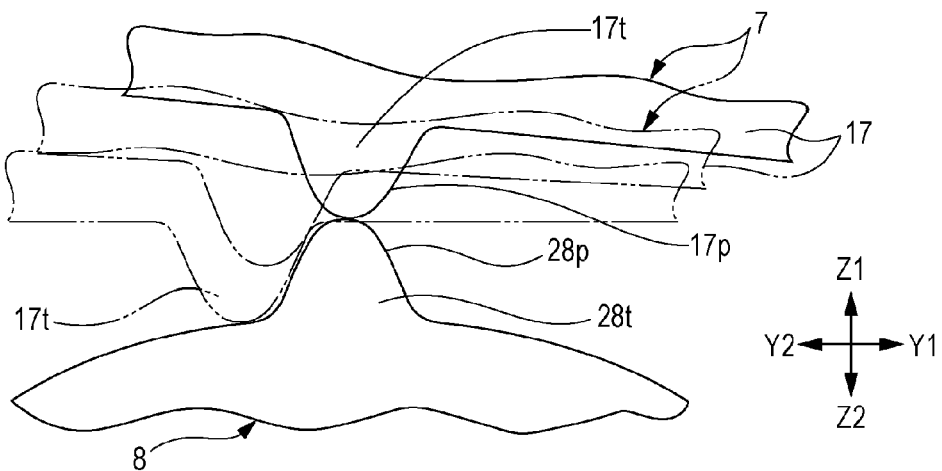
Figure 15C:
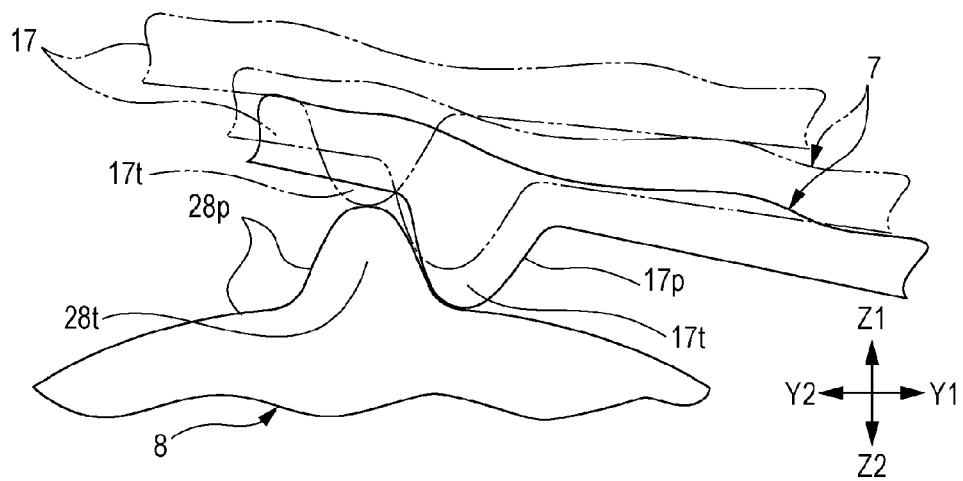
Figure 17:
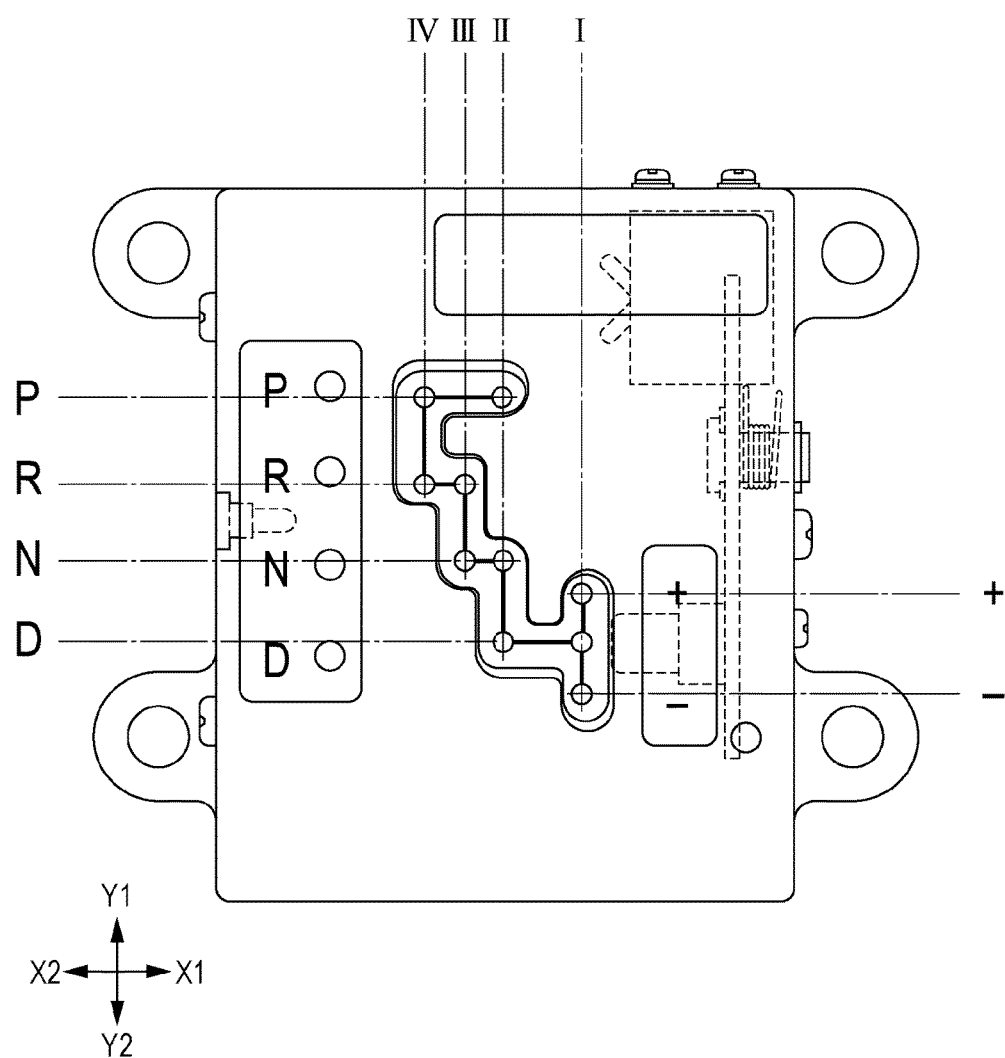
FIG. 17 is a top view of a shift pattern of a vehicle to which a shift operating apparatus for an automatic transmission of a related-art example is applied.
Figure 18:
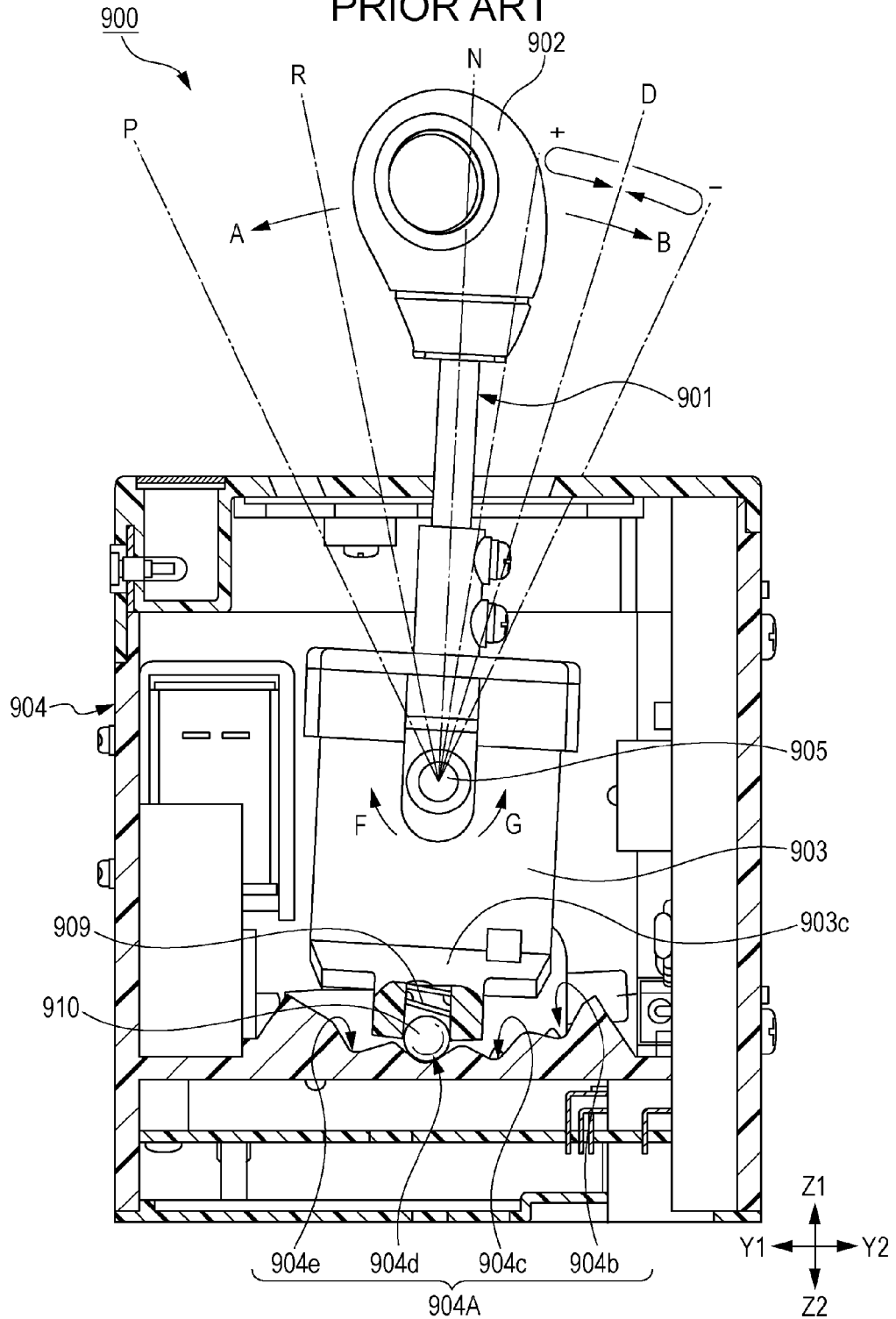
FIG. 18 is an enlarged longitudinal sectional view of a state in which a shift lever is in an N range (neutral range) of FIG. 17 in the shift operating apparatus for an automatic transmission of the related-art example.
Figure 19:
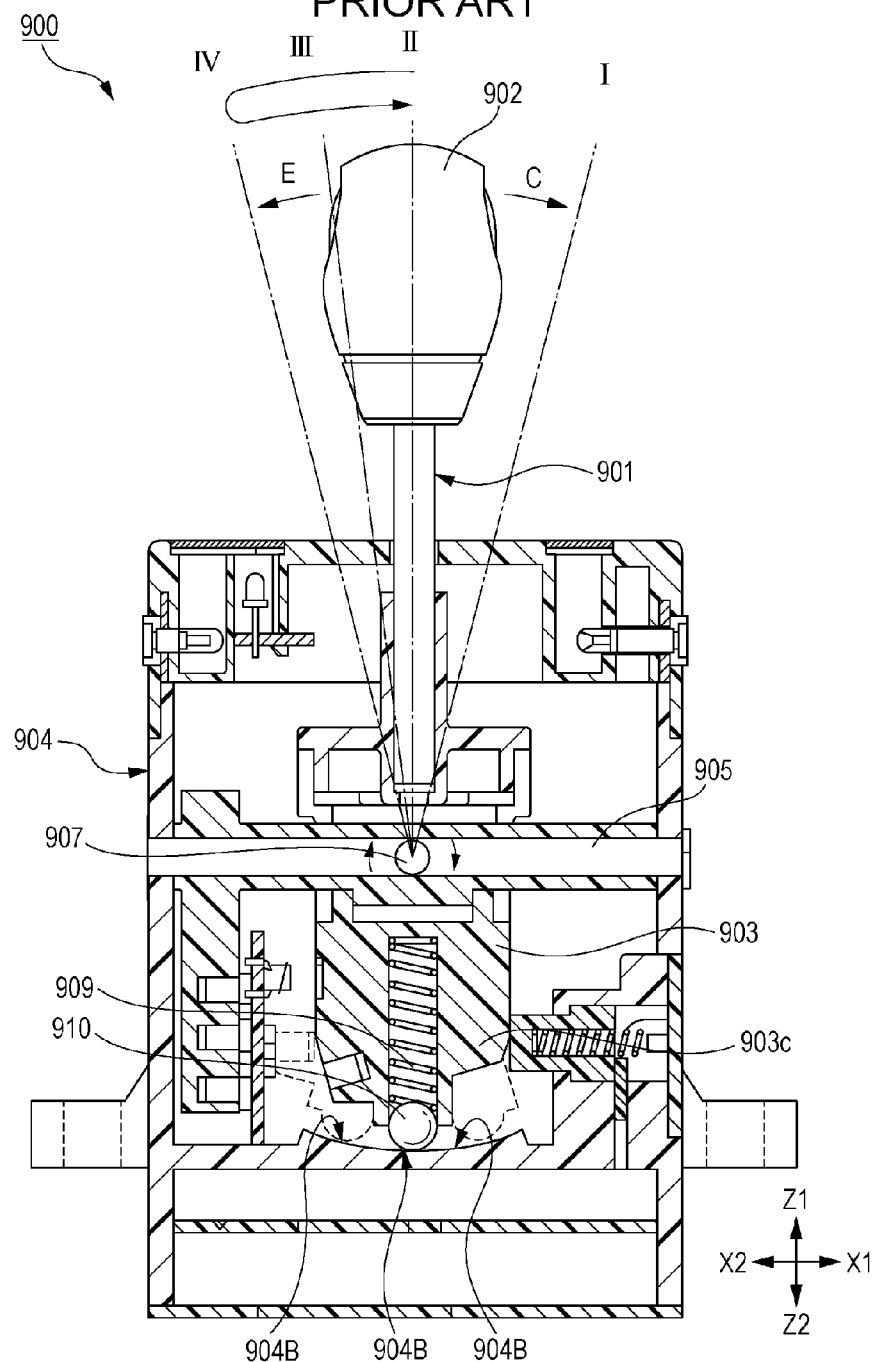
FIG. 19 is an enlarged longitudinal sectional view of a state in which the shift lever is at a second line II of FIG. 17 in the shift operating apparatus for an automatic transmission of the related-art example.

Referring to FIGS. 8B, 14A and 14B, and 15A to 15C, the drive member 7 and the cam member 8 are further described by describing movements in the second direction D2 in the multi-directional operating device 101. Furthermore, in terms of the movements in the second direction D2, a movement between the reference positions, that is, between the first position P1 and the second position P2 (see FIG. 4B) caused by the inclination operation performed by the operator is described. FIGS. 15A to 15C are schematic views illustrating movements in the multi-directional operating device 101 according to the first embodiment of the present invention, and out of FIGS. 15A to 15C, FIG. 15A illustrates a state in which the operating member 1 is positioned at the first position P1 (state of FIG. 14A), FIG. 15B illustrates a state in which the operating member 1 is positioned between the first position P1 and the second position P2, and FIG. 15C illustrates a state in which the operating member 1 is positioned at the second position P2 (state of FIG. 14B). Two-dot chain lines of FIGS. 15B and 15C represent loci of the drive member 7.

Initially, when the operating member 1 is at the first position P1 as the reference position illustrated in FIG. 15A, the second movable magnetic member M24 and the fourth movable magnetic member M44 are close to each other and face each other with the second facing magnetic member T24 interposed therebetween as illustrated in FIG. 8B. Accordingly, the pair of the second movable magnetic member M24 and the fourth movable magnetic member M44 are pulled toward each other. In this state, the guide surface 17p of the drive member 7 integrated with the second movable magnetic member M24 and the sliding surface 28p of the cam member 8 included in the support body 2 (side wall portion of the casing K2) are in contact with each other.

Next, when the inclination operation from the first position P1 as the reference position of FIG. 8A toward one side in the second direction D2 (Y1 direction of FIG. 8B) is performed by the operator on the operating member 1, the drive member 7 is moved toward the one side as the operating member 1 is inclined as illustrated in FIG. 15B. In so doing, the guide surface 17p (mainly the surface of the first projection 17t) of the drive member 7 slides against the sliding surface 28p (mainly the surface of the second projection 28t) of the cam member 8, and, as illustrated in FIG. 15B, the top of the first projection 17t and the second projection 28t are brought into abutment with each other. This causes the drive member 7 to be moved upward which is a direction separating from the cam member 8 (Z1 direction of FIGS. 15A to 15C), and accordingly, the second movable magnetic member M24 (movable magnetic member MM) integrated with the drive member 7 is also moved along the shape of a projecting portion of the second projection 28t so as to be moved upward.

Meanwhile, the fourth movable magnetic member M44 being the other of the pair of the second movable magnetic member M24 and the fourth movable magnetic member M44 has been strongly pulled toward the second facing magnetic member T24 through the cushioning member. However, the fourth movable magnetic member M44 is stopped by the projection 32t provided in the frame 32, and accordingly, the second movable magnetic member M24 and the fourth movable magnetic member M44 are separated from each other. Thus, the strong attraction state of the second movable magnetic member M24 and the fourth movable magnetic member M44 changes to the weak attraction state.

Furthermore, when the inclination operation from the position of FIG. 15B toward the one direction is continued to be performed by the operator, as illustrated in FIG. 15C, the drive member 7 is further moved toward the one side and the guide surface 17p of the drive member 7 slides against the sliding surface 28p of the cam member 8. Thus, the drive member 7 is moved to the second position P2 as the reference position illustrated in FIG. 15C.

As has been described, when the operating member 1 is inclined in the second direction D2 (Y1 direction of FIGS. 14A and 14B) from the reference position at the first position P1 so as to be positioned at the second position P2, the first projection 17t provided on the guide surface 17p of the drive member 7 and the second projection 28t provided on the sliding surface 28p of the cam member 8 abutting each other are move beyond the projecting portions of each other and slide on each other. Thus, one of the movable magnetic members MM (the second movable magnetic member M24 according to the first embodiment of the present invention) interlocked with the drive member 7 is moved along the shape of the projecting portion, and the pair of movable magnetic members (second movable magnetic member M24 and fourth movable magnetic member M44) are gradually pulled away from and separated from each other until both the tops of the first projection 17t and the second projection 28t are brought into abutment with each other. After that, the pair of movable magnetic members MM approach each other again. In so doing, the strong attraction state changes to the weak attraction state accordingly. This change can provide tactile sensation to the operator. Thus, since a simple cam structure and the pair of movable magnetic members MM are utilized, the size in the depth direction can be reduced compared to the related-art example. Of course, similar movements are performed also when the operating member 1 is inclined in the second direction D2 (Y2 direction of FIGS. 14A and 14B) from the reference position at the second position P2 so as to be positioned at the first position P1.

At last, a guide portion 55, which is preferably provided in the multi-directional operating device 101, is described. FIG. 16 illustrates the guide portion 55 of the multi-directional operating device 101 according to the first embodiment of the present invention and is an enlarged plan view of portion XVI of FIG. 13A seen from the Z1 side. FIG. 16 schematically illustrates a form in which a guide projection 15 is positioned in the guide portion 55 by two-dot chain lines. Numbers written above the numeral of the guide projection 15 are the positions of the shift knob 50N of FIG. 4B.

As illustrated in FIG. 13A, the guide portion 55 is provided as a groove penetrating through the bottom wall of the casing K2. As illustrated in FIG. 16, the guide portion 55 has two guides in the first direction D1, that is, first guides 55a, and a second guide 55b connecting two guides, that is, the first guides 55A to each other in the second direction D2. The guide projection 15 provided in the operating member 1 is inserted into the guide portion 55.

As illustrated in FIG. 16, the guide projection 15 is moved in the first guides 55a of the guide portion 55 as the operating member 1 is inclined in the first direction D1. In so doing, since the guide projection 15 is rotated in the opposite direction to the inclination direction of the operating shaft 1j of the operating member 1, the positions of the guide projection 15 of FIG. 16 are reversed with respect to the positions of the shift knob 50N of FIG. 4B with the reference position (first position P1 or second position P2) kept at the center.

Furthermore, since the guide projection 15 is also inclined as the operating member 1 is inclined in the second direction D2, when the operating member 1 is at the reference position, the guide projection 15 is movable between the first guides 55a through the second guide 55b in the guide portion 55.

Meanwhile, in the case where the operating member 1 is at any one of the positions other than the reference position (first position P1 or second position P2), even when the operating member 1 is inclined in the second direction D2, the guide projection 15 is brought into contact with the side wall of the guide portion 55 (first guides 55a), thereby the amount of a movement in the second direction D2 that is equal to or more than a specified amount is regulated. This can allow the inclination in the second direction D2 to be performed at desired positions and suppress the performing of the inclination in the second direction D2 at unnecessary positions. According to the first embodiment of the present invention, the desired positions include the first position P1 and the second position P2, and the other positions include the front position S11, the rear position S13, the first front position S21, the second front position S22, the first rear position S23, and the second rear position S24.

Furthermore, since the guide projection 15 is moved by being guided by the second guide 55b in the movement in the second direction D2 according to the first embodiment of the present invention, even when the operating member 1 is unnecessarily inclined in the first direction D1, the guide projection 15 is brought into contact with the side wall of the second guide 55b, thereby the amount of a movement in the first direction D1 that is equal to or more than a specified amount is regulated. This can allow the inclination in the first direction D1 to be performed only at desired positions.

As has been described, the multi-directional operating device 101 according to the first embodiment of the present invention can be preferably applied to the vehicle shift apparatus 500 having the shift arrangement (shift pattern) illustrated in FIG. 4A. That is, since the vehicle shift apparatus 500 according to the first embodiment of the present invention has the shift arrangement (shift pattern) with which the operation in the first direction D1 toward each of the positions (front position S11 or first front position S21, second front position S22, first position P1 or second position P2, rear position S13 or first rear position S23, second rear position S24) can be performed, the multi-directional operating device 101 can be preferably applied to this vehicle shift apparatus 500. Thus, the vehicle shift apparatus 500 allows shift operations with tactile sensation to be performed. Furthermore, compared to the related-art example, in terms of the first direction D1, there is no sliding mechanism in a portion where the tactile sensation is produced. Accordingly, the vehicle shift apparatus 500 has good durability.

Furthermore, since the simple cam structure (drive member 7 and cam member 8) and the pair of movable magnetic members MM are utilized, the size in the depth direction can be reduced compared to the related-art example. Thus, the vehicle shift apparatus 500 providing tactile sensation and having good durability and a reduced size can be provided.

Furthermore, when the operating member 1 of the multi-directional operating device 101 is at the reference position, the pairs of the movable magnetic members MM are attracted to and pulled toward one another with the corresponding facing magnetic members TM interposed therebetween. This is still more preferable for the vehicle shift apparatus 500 because, when the shift knob 50N engaged with the operating member 1 is at the reference position, play of the shift knob 50N is suppressed even during traveling of the vehicle.

The present invention is not limited to the above-described embodiment and can be modified so as to be implemented, for example, as follows. These modifications are within the scope of the present invention.

First Modification

Although the drive member 7 is provided in one of the movable magnetic members MM (second movable magnetic member M24) according to the above-described first embodiment, this is not limiting. It is sufficient that either or each of one of the movable members HK and one of the movable magnetic members MM which are rotated as the operating member 1 is inclined (inclined in the first direction D1) be provided with the drive member 7.

Second Modification

Although the drive member 7 and the cam member 8 are each provided at a single position in one of outer end portions of the multi-directional operating device 101 in the first direction D1 according to the above-described first embodiment, this is not limiting. For example, the drive member 7 may be provided at each of the outer end portions, that is, at two positions in the first direction D1 and the cam member 8 may be provided at each of the outer end portions, that is, at two positions in the first direction D1. This can increase (substantially double) operating load applied to the operator for the inclination operation in the second direction D2. Furthermore, with the drive member 7 and the cam member 8 provided at each outer end portion, a well-balanced inclination operation in the second direction D2 can be performed. Furthermore, sliding load of the drive member 7 and the cam member 8 per position can be reduced, and accordingly, durability can be improved.

Third Modification

Although the number of second projections 28t provided on the sliding surface 28p of the cam member 8 is one according to the above-described first embodiment, this is not limiting. Two or more second projections 28t can be provided. This allows the inclination operation toward two or more positions to be performed also in the second direction D2.

Fourth Modification

Although the guide portion 55 is defined by the groove formed in the bottom wall of the casing K2 according to the above-described first embodiment, this is not limiting. For example, the guide portion 55 may be a wall that stands erect on the bottom wall of the casing K2.

Fifth Modification

Although the surfaces of the projections 32t provided in the frame 32 of the support body 2 are preferably used as the stopper portions 6 according to the above-described first embodiment, this is not limiting. A mechanism that stops the inclination of, out of the pair of the one and the other of the movable magnetic members MM, the other movable magnetic member MM may be provided.

Sixth Modification

Although the facing magnetic members TM (first facing magnetic member T14 and second facing magnetic member T24) have the same size and the same shape so that the intensity of the respective magnetic fields are the same according to the above-described first embodiment, the magnetic intensity may vary between the left and right. This can change operating sensation in the first direction D1 (X1 direction or X2 direction).

Seventh Modification

Although the inclination shaft 12e of the support body 2 is preferably formed of a soft magnetic material according to the above-described first embodiment, this is not limiting. The inclination shaft 12e may be formed of, for example, a metal material such as non-magnetic aluminum or a non-magnetic copper alloy or a non-magnetic synthetic resin material.

The present invention is not limited to the above-described embodiment and can be appropriately changed without departing from the gist of the present invention.

What is claimed is:

1. A multi-directional operating device comprising:
   an operating member that is inclined from a reference position by being subjected to an operation performed by an operator;
   a support body that supports the operating member so as to allow the operating member to be inclined from the reference position;
   a plurality of stopper portions that respectively correspond to a plurality of positions which are provided in the multi-directional operating device and at which the operating member subjected to an inclination operation from a reference position performed by the operator is positioned;
   a plurality of movable members inclined from the reference position together with the operating member;
   at least one pair of movable magnetic members that face each other, that are each provided in a corresponding one of the plurality of movable members, and that comprise a soft magnetic material;
   a facing magnetic member that is disposed between the at least one pair of movable magnetic members and that comprise a permanent magnet;
   a drive member provided in at least one of the plurality of movable members and one of the at least one pair of the movable magnetic members and that is rotated as the operating member is inclined from the reference position; and
   a cam member provided in the support body so as to face one side of the drive member,
   wherein one of the drive member and the cam member that face each other has a guide surface having a first projection having a projection shape, another of the drive member and the cam member has a sliding surface having a second projection having a projection shape, and the guide surface and the sliding surface slide on each other,
   wherein, when the operating member is at the reference position, the at least one pair of movable magnetic members are attracted to each other and the guide surface and the sliding surface are in contact with each other due to attracting forces of the at least one pair of movable magnetic members,
   wherein, when the operating member is inclined in a first direction from the reference position so as to be positioned at any one of positions in the first direction out of the plurality of positions, one of the at least one pair of movable magnetic members is inclined from the reference position and inclination of another of the at least one pair of movable magnetic members is stopped by a corresponding one of the plurality of stopper portions, and
   wherein, when the operating member is inclined from the reference position in a second direction intersecting the first direction so as to be positioned at any one of positions in the second direction out of the plurality of positions, the first projection of the guide surface and the second projection of the sliding surface are moved beyond projecting portions of each other and slide on each other.

2. The multi-directional operating device according to claim 1, wherein the support body includes:
   an inclination shaft that allows the operating member to be inclined from the reference position in the first direction,
   wherein the operating member includes:
   a rod-shaped operating shaft, and
   a base portion that extends in a plane through which a shaft axis of the operating shaft penetrates,
   wherein the base portion is rotated about the inclination shaft as a shaft axis,
   wherein the base portion includes:
   a first pressure portion and a second pressure portion provided on respective sides of the operating shaft with the inclination shaft interposed therebetween,
   wherein the plurality of movable members include:
   a first movable member facing the first pressure portion,
   a second movable member facing the second pressure portion,
   a third movable member, and
   a fourth movable member,
   wherein the at least one pair of movable magnetic members include:
   a first movable magnetic member provided in the first movable member,
   a second movable magnetic member provided in the second movable member,
   a third movable magnetic member paired with the first movable magnetic member, and
   a fourth movable magnetic member paired with the second movable magnetic member,
   wherein the third movable member is provided with the third movable magnetic member and the fourth movable member is provided with the fourth movable magnetic member, wherein, when the operating member is subjected to the inclination operation toward one side in the first direction, the first pressure portion that is inclined from the reference position in an inclination operation direction of the base portion presses the first movable member that faces the first pressure portion, the first movable magnetic member provided in the first movable member is inclined from the reference position, a corresponding one of the plurality of stopper portions stops inclination of the third movable magnetic member, and the first movable magnetic member and the third movable magnetic member are separated from each other, and wherein, when the inclination operation toward the one side is further continued, the second pressure portion presses the second movable member that faces the second pressure portion, the second movable magnetic member provided in the second movable member is inclined from the reference position, a corresponding one of the plurality of stopper portions stops inclination of the fourth movable magnetic member, and the second movable magnetic member and the fourth movable magnetic member are separated from each other.

3. The multi-directional operating device according to claim 2, wherein the base portion includes:
a third pressure portion that faces the third movable member, and
a fourth pressure portion that faces the fourth movable member,
wherein the third pressure portion and the fourth pressure portion are provided on respective sides of the operating shaft with the inclination shaft interposed therebetween,
wherein, when the operating member is subjected to the inclination operation toward another side in the first direction, the third pressure portion that is inclined from the reference position in an inclination operation direction of the base portion presses the third movable member that faces the third pressure portion, the third movable magnetic member provided in the third movable member is inclined from the reference position, a corresponding one of the plurality of stopper portions stops inclination of the first movable magnetic member, and the first movable magnetic member and the third movable magnetic member are separated from each other, and
wherein, when the inclination operation toward the other side is further continued, the fourth pressure portion presses the fourth movable member that faces the fourth pressure portion, the fourth movable magnetic member provided in the fourth movable member is inclined from the reference position, a corresponding one of the plurality of stopper portions stops inclination of the second movable magnetic member, and the second movable magnetic member and the fourth movable magnetic member are separated from each other.

4. The multi-directional operating device according to claim 1, further comprising:
a guide projection that is moved as the operating member is inclined from the reference position,
wherein a guide portion is provided so as to be, when the operating member is inclined from the reference position in the second direction, brought into contact with the guide projection, thereby an amount of a movement of the guide projection that is equal to or more than a specified amount is regulated.

5. The multi-directional operating device according to claim 1,
wherein the plurality of movable members comprise a soft magnetic material and integrally formed with the at least one pair of movable magnetic members.

6. The multi-directional operating device according to claim 1,
wherein both end sides of each of the at least one pair of movable magnetic members are bent so that end surfaces of the at least one pair of movable magnetic members face one another.

7. The multi-directional operating device according to claim 1,
wherein, when the at least one pair of movable magnetic members are separated from each other by inclining the operating member, the at least one pair of movable magnetic members are disposed at such positions that the attracting forces acting between the at least one pair of movable magnetic members are not eliminated.

8. A vehicle shift apparatus comprising:
the multi-directional operating device comprising:
an operating member that is inclined from a reference position by being subjected to an operation performed by an operator;
a support body that supports the operating member so as to allow the operating member to be inclined from the reference position;
a plurality of stopper portions that respectively correspond to a plurality of positions which are provided in the multi-directional operating device and at which the operating member subjected to an inclination operation from a reference position performed by the operator is positioned;
a plurality of movable members inclined from the reference position together with the operating member;
at least one pair of movable magnetic members that face each other, that are each provided in a corresponding one of the plurality of movable members, and that comprise a soft magnetic material;
a facing magnetic member that is disposed between the at least one pair of movable magnetic members and that comprise a permanent magnet;
a drive member provided in at least one of the plurality of movable members and one of the at least one pair of the movable magnetic members and that is rotated as the operating member is inclined from the reference position; and
a cam member provided in the support body so as to face one side of the drive member,
wherein one of the drive member and the cam member that face each other has a guide surface having a first projection having a projection shape, another of the drive member and the cam member has a sliding surface having a second projection having a projection shape, and the guide surface and the sliding surface slide on each other,
wherein, when the operating member is at the reference position, the at least one pair of movable magnetic members are attracted to each other and the guide surface and the sliding surface are in contact with each other due to attracting forces of the at least one pair of movable magnetic members,
wherein, when the operating member is inclined from the reference position in a first direction from the reference position so as to be positioned at any one of positions in the first direction out of the plurality of positions, one of the at least one pair of movable magnetic members is inclined from the reference position and inclination of another of the at least one pair of movable magnetic members is stopped by a corresponding one of the plurality of stopper portions, and wherein, when the operating member is inclined from the reference position in a second direction intersecting the first direction so as to be positioned at any one of positions in the second direction out of the plurality of positions, the first projection of the guide surface and the second projection of the sliding surface are moved beyond projecting portions of each other and slide on each other;

a controller that receives a signal from the multi-directional operating device and transmits a signal to a vehicle-side device;

a shift knob engaged with the operating member of the multi-directional operating device and held by the operator; and position detecting means that detects the plurality of positions where the operating member is positioned.

* * * * *